United States Patent
Higgins

(10) Patent No.: US 11,074,079 B2
(45) Date of Patent: Jul. 27, 2021

(54) EVENT HANDLING INSTRUCTION PROCESSING

(71) Applicant: V12 TECHNOLOGY LIMITED, Marlow Buckinghamshire (GB)

(72) Inventor: Greg Higgins, Marlow (GB)

(*) Notice: Subject to any disclaimer, the term of this patent is extended or adjusted under 35 U.S.C. 154(b) by 0 days.

(21) Appl. No.: 16/461,928

(22) PCT Filed: Nov. 17, 2017

(86) PCT No.: PCT/GB2017/053462
§ 371 (c)(1),
(2) Date: May 17, 2019

(87) PCT Pub. No.: WO2018/091909
PCT Pub. Date: May 24, 2018

(65) Prior Publication Data
US 2019/0278607 A1 Sep. 12, 2019

(30) Foreign Application Priority Data
Nov. 18, 2016 (GB) .................................... 1619572

(51) Int. Cl.
*G06F 9/448* (2018.01)
*G06F 9/38* (2018.01)
(Continued)

(52) U.S. Cl.
CPC .............. *G06F 9/3838* (2013.01); *G06F 8/49* (2013.01); *G06F 9/3855* (2013.01); *G06F 9/448* (2018.02); *G06F 16/9024* (2019.01)

(58) Field of Classification Search
CPC . G06F 9/44; G06F 9/448; G06F 9/542; G06F 8/10; G06F 2201/86; G06F 2201/88
See application file for complete search history.

(56) References Cited

U.S. PATENT DOCUMENTS 5,625,788 A * 4/1997 Boggs ................... G06F 9/3836 712/214
5,740,393 A * 4/1998 Vidwans ............... G06F 9/3836 712/215

(Continued)

FOREIGN PATENT DOCUMENTS

| EP | 537098 A2 | 4/1993 |
| WO | 2015044629 A1 | 4/2015 |

OTHER PUBLICATIONS

Search Report dated Apr. 13, 2017 in reference to co-pending Application No. GB1619572.9.
(Continued)

*Primary Examiner* — Duy Khuong T Nguyen
(74) *Attorney, Agent, or Firm* — Dinsmore & Shohl LLP

(57) ABSTRACT

A method of providing instructions to computer processing apparatus for improved event handling comprises the following. Instructions for execution on the computer processing apparatus are provided to an event processor generator. These instructions comprise a plurality of functional steps, a set of dependencies between the functional steps, and configuration data. The event processor generator creates instances of the functional steps from the instructions and represents the instances as directed acyclic graphs. The event processor generator identifies a plurality of event types and topologically sort is the directed acyclic graphs to determine a topologically ordered event path for each event type. The event processor generator then provides a revised set of instructions for execution on the computer processing apparatus in which original instructions have been replaced by instructions requiring each event type to be executed according to its topologically ordered event path. Suitable computing apparatus for executing the event processor gen- (Continued)

erator and for storing and running the generated event processor code is also described.

18 Claims, 31 Drawing Sheets

(51) Int. Cl.
    *G06F 16/901*     (2019.01)
    *G06F 8/41*     (2018.01)

(56) References Cited

U.S. PATENT DOCUMENTS

| | | | | |
|---|---|---|---|---|
| 5,889,982 A | * | 3/1999 | Rodgers | G06F 9/4812 |
| | | | | 712/229 |
| 2006/0294499 A1 | | 12/2006 | Shim | |
| 2016/0321039 A1 | * | 11/2016 | Chaudhuri | G06F 8/65 |

OTHER PUBLICATIONS

European Patent Office Search Report dated Feb. 28, 2018 in reference to co-pending European Patent Application No. PCT/GB2017/053462 filed Nov. 17, 2017.

\* cited by examiner

```
Public void processEvent(A a) {
    fa.onEvent(a);
    f1.onUpdate();
    f2.onUpdate();
    f3.onUpdate();
    f4.onUpdate();
}
Public void processEvent(B b) {
    fb.onEvent(b);
    f1.onUpdate();
    f2.onUpdate();
    f3.onUpdate();
    f4.onUpdate();
}
Public void processEvent(C c) {
    fc.onEvent(c);
    f2.onUpdate();
    f4.onUpdate();
}
```

Fig. 8D

```
Fa fa = new Fa();
Fb fb = new Fb();
Fc fc = new Fc();
F1 f1 = new F1(fa, fb);
F2 f2 = new F2(f1, fc);
F3 f3 = new F3(f1);
F4 f4 = new F4(f2, f3);
```

Fig. 8B

| Function Call order | Event type | | |
|---|---|---|---|
| | A | B | C |
| 1st | Fa | Fb | Fc |
| 2nd | F1 | F1 | F2 |
| 3rd | F2, F3 | F2, F3 | F4 |

Fig. 8C

```
Public void processEvent(A a){
   if(a.val == 1){
     fa1.onEvent(a);
     f1.onEvent();
   }else if(a.val == 2){
     fa2.onEvent(a);
     f2.onEvent();
   }

}
```

| Function Call order | Event type + filter value | | |
|---|---|---|---|
| | A, val=1 | B, val=2 | C |
| 1st | Fa | Fb | - |
| 2nd | F1 | F2 | - |
| 4th | - | - | - |

```
Public void processEvent(A a){
  boolean updateChild = fa1.onEvent(a);
  if(updateChild){
    f1.onEvent();
  }
}
```

```
Public void processEvent(A a){
   fa1.onEvent(a);
   f1.onParentUpdate(fa1);
   f1.onEvent();
}

Public void processEvent(B b){
   fb1.onEvent(b);
   f1.onParentUpdate(fb1);
   f1.onEvent();
}
```

```
public class WordCounterInlineEventHandler { public transient int wordCount;
    public transient int charCount;
    public transient int lineCount;
    private int increment = 1;

@EventHandler
    public void onAnyChar(CharEvent event) {
        charCount++;
    }

@EventHandler(filterId = '\t')
    public void onTabDelimiter(CharEvent event) {
        increment = 1;
    }

@EventHandler(filterId = ' ')
    public void onSpaceDelimiter(CharEvent event) {
        increment = 1;
    }

@EventHandler(filterId = '\n')
    public void onEol(CharEvent event) { lineCount++;
        increment = 1;
    }

@EventHandler(FilterType.unmatched)
    public void onUnmatchedChar(CharEvent event) {
        wordCount += increment;
        increment = 0;
    }

@Override
    public String toString() {
        return "wc\n" + "charCount:" + charCount + "\nwordCount:" + wordCount
                    + "\nlineCount:" + lineCount;
    } public static class Builder extends SEPConfig {
        {
            addPublicNode(new WordCounterInlineEventHandler(), "result");
        }
    }
}
```

Figure 16a

```
public class WcSep_inline implements EventHandler, BatchHandler, Lifecycle {

// Node declarations
    public final com.fluxtion.sample.wcapp.WordCounterInlineEventHandler result = new
com.fluxtion.sample.wcapp.WordCounterInlineEventHandler();
    // Dirty flags // Filter constants public WcSep_inline() {
        // result
    }

@Override
    public void onEvent(com.fluxtion.runtime.event.Event event) {
        switch (event.getClass().getName()) {
            case ("com.fluxtion.sample.wcapp.CharEvent") : {
                com.fluxtion.sample.wcapp.CharEvent typedEvent =
(com.fluxtion.sample.wcapp.CharEvent) event;
                handleEvent(typedEvent);
                break;
            }
        }
    } public void handleEvent(com.fluxtion.sample.wcapp.CharEvent typedEvent) {
        switch (typedEvent.filterId()) {
        // Event Class:[com.fluxtion.sample.wcapp.CharEvent] filterId:[9]
            case (9) :
                result.onTabDelimiter(typedEvent);
                result.onAnyChar(typedEvent);
                afterEvent();
                return;
                // Event Class:[com.fluxtion.sample.wcapp.CharEvent]
                // filterId:[10]
            case (10) :
                result.onEol(typedEvent);
                result.onAnyChar(typedEvent);
                afterEvent();
                return;
                // Event Class:[com.fluxtion.sample.wcapp.CharEvent]
                // filterId:[32]

case (32) :
                result.onSpaceDelimiter(typedEvent);
                result.onAnyChar(typedEvent);
                afterEvent();
                return;
        }
        // Default, no filter methods
        result.onAnyChar(typedEvent);
        result.onUnmatchedChar(typedEvent);
        // event stack unwind callbacks
        afterEvent();
    }
}
```

Figure 16B

```
public class AssetEventHandler {

@FilterId
    public String portfolioName;

@EventHandler
    public boolean handleValuation(AssetEvent assetEvent) {
        //calculate %change if greater than 10% the notify
        boolean breach = false;
        if (valuation != Integer.MIN_VALUE) {
            double delta = Math.abs(valuation - assetEvent.getValuation()) / (double) valuation;
            System.out.println("delta[" + portfolioName + "] = " + delta);
            breach = delta > 0.1;
        }
        valuation = assetEvent.getValuation();
        return breach;
    }
}
```

Figure 18A

```
public class AssetMonitor implements EventHandler, BatchHandler, Lifecycle {

//Node declarations
    private final com.fluxtion.sample.dirtyfiltering.AssetEventHandler
assetEventHandler_1 = new com.fluxtion.sample.dirtyfiltering.AssetEventHandler();
    private final com.fluxtion.sample.dirtyfiltering.AssetEventHandler
assetEventHandler_3 = new com.fluxtion.sample.dirtyfiltering.AssetEventHandler();
    private final com.fluxtion.sample.dirtyfiltering.AssetEventHandler
assetEventHandler_5 = new com.fluxtion.sample.dirtyfiltering.AssetEventHandler();
    private final com.fluxtion.sample.dirtyfiltering.AssetEventHandler
assetEventHandler_7 = new com.fluxtion.sample.dirtyfiltering.AssetEventHandler();
    public final com.fluxtion.sample.dirtyfiltering.BreachNotifier notifier = new
com.fluxtion.sample.dirtyfiltering.BreachNotifier();
//Dirty flags
    private boolean isDirty_assetEventHandler_1 = false;
    private boolean isDirty_assetEventHandler_5 = false;
    private boolean isDirty_assetEventHandler_3 = false;
    private boolean isDirty_assetEventHandler_7 = false;
//Filter constants public AssetMonitor() {
        //assetEventHandler_1
        assetEventHandler_1.portfolioName = "FX";
        //assetEventHandler_3
        assetEventHandler_3.portfolioName = "Equities";
        //assetEventHandler_5
        assetEventHandler_5.portfolioName = "Blah";
        //assetEventHandler_7
        assetEventHandler_7.portfolioName = "Commodities";
        //notifier
        notifier.assets = new com.fluxtion.sample.dirtyfiltering.AssetEventHandler[4];
        notifier.assets[0] = assetEventHandler_1;
        notifier.assets[1] = assetEventHandler_3;
        notifier.assets[2] = assetEventHandler_5;
        notifier.assets[3] = assetEventHandler_7;
    }

@Override
    public void onEvent(com.fluxtion.runtime.event.Event event) {
        switch (event.getClass().getName()) {
            case ("com.fluxtion.sample.dirtyfiltering.AssetEvent"): {
                com.fluxtion.sample.dirtyfiltering.AssetEvent typedEvent =
(com.fluxtion.sample.dirtyfiltering.AssetEvent) event;
                handleEvent(typedEvent);
                break;
            }
        }

```
public void handleEvent(com.fluxtion.sample.dirtyfiltering.AssetEvent typedEvent) {
    switch (typedEvent.filterString()) {
        case ("Blah"):
            isDirty_assetEventHandler_5 =
assetEventHandler_5.handleValuation(typedEvent);
            if (isDirty_assetEventHandler_5) {
                notifier.assetBreached(assetEventHandler_5);
            }
            if (isDirty_assetEventHandler_5 || isDirty_assetEventHandler_1 ||
isDirty_assetEventHandler_3 || isDirty_assetEventHandler_7) {
                notifier.onEvent();
            }
            afterEvent();
            return;
        case ("Commodities"):
            isDirty_assetEventHandler_7 =
assetEventHandler_7.handleValuation(typedEvent);
            if (isDirty_assetEventHandler_7) {
                notifier.assetBreached(assetEventHandler_7);
            }
            if (isDirty_assetEventHandler_5 || isDirty_assetEventHandler_1 ||
isDirty_assetEventHandler_3 || isDirty_assetEventHandler_7) {
                notifier.onEvent();
            }
            afterEvent();
            return;
        case ("Equities"):
            isDirty_assetEventHandler_3 =
assetEventHandler_3.handleValuation(typedEvent);
            if (isDirty_assetEventHandler_3) {
                notifier.assetBreached(assetEventHandler_3);
            }
            if (isDirty_assetEventHandler_5 || isDirty_assetEventHandler_1 ||
isDirty_assetEventHandler_3 || isDirty_assetEventHandler_7) {
                notifier.onEvent();
            }
            afterEvent();
            return;
        case ("FX"):
            isDirty_assetEventHandler_1 =
assetEventHandler_1.handleValuation(typedEvent);
            if (isDirty_assetEventHandler_1) {
                notifier.assetBreached(assetEventHandler_1);
            }
            if (isDirty_assetEventHandler_5 || isDirty_assetEventHandler_1 ||
isDirty_assetEventHandler_3 || isDirty_assetEventHandler_7) {
                notifier.onEvent();
            }
            afterEvent();
            return;
    }
    afterEvent();
}
```

Figure 18B-2

```
public class FlightDelaySupDeclarativeBuilder extends SEPConfig {

Wrapper<FlightDetails> delayedFlight =
greaterThanFilter(FlightDetails.class, FlightDetails::getDelay, 0);
    GroupByBuilder<FlightDetails, CarrierDelay> carrierDelay =
groupBy(delayedFlight, FlightDetails, CarrierDelay, CarrierDelay.class);
    carrierDelay.init(FlightDetails::getCarrier,
CarrierDelay::setCarrierId);
    carrierDelay.avg(FlightDetails::getDelay, CarrierDelay::setAvgDelay);
    carrierDelay.count(FlightDetails::getDelay,
CarrierDelay::setTotalFlights);
    carrierDelay.sum(FlightDetails::getDelay,
CarrierDelay::setTotalDelayMins);
    addPublicNode(carrierDelay.build(), "carrierDelayMap");
}
}
```

Figure 19A

```
public static class FlightDetails extends Event { public FlightDetails() {
    } public FlightDetails(String filterString, int delay) {
        super();
        this.delay = delay;
        this.filterString = filterString;
    } public int delay;

public String getCarrier() {
        return filterString;
    } public int getDelay() {
        return delay;
    }
}
```

Figure 19B

```java
    public static class CarrierDelay{ private String carrierId;
        private int avgDelay;
        private int totalFlights;
        private int totalDelayMins;

public String getCarrierId() {
            return carrierId;
        } public void setCarrierId(String carrierId) {
            this.carrierId = carrierId;

} public int getAvgDelay() {
            return avgDelay;
        } public void setAvgDelay(int avgDelay) {
            this.avgDelay = avgDelay;
        } public int getTotalFlights() {
            return totalFlights;
        } public void setTotalFlights(int totalFlights) {
            this.totalFlights = totalFlights;
        } public int getTotalDelayMins() {
            return totalDelayMins;
        } public void setTotalDelayMins(int totalDelayMins) {
            this.totalDelayMins = totalDelayMins;
        }

@Override
        public String toString() {
            return "CarrierDelay{" + "carrierId=" + carrierId + ", avgDelay=" +
avgDelay + ", totalFlights=" + totalFlights + ", totalDelayMins=" + totalDelayMins
+ '}';
        }

```java
public class FlightDelayDeclarativeMonitor implements EventHandler, BatchHandler,
Lifecycle {

//Node declarations
    private final FlightDetailsHandler flightDetailsHandler_1 = new
FlightDetailsHandler();
    private final GreaterThanDecorator_21 greaterThanDecorator_21_3 = new
GreaterThanDecorator_21();
    public final GroupBy_26 carrierDelayMap = new GroupBy_26();
    //Dirty flags
    private boolean isDirty_carrierDelayMap = false;
    private boolean isDirty_greaterThanDecorator_21_3 = false;
    private boolean isDirty_flightDetailsHandler_1 = false;
    //Filter constants public FlightDelayDeclarativeMonitor() {
      //flightDetailsHandler_1
      //greaterThanDecorator_21_3
      greaterThanDecorator_21_3.filterSubject = flightDetailsHandler_1;
      greaterThanDecorator_21_3.source_FlightDetailsHandler_20 =
flightDetailsHandler_1;
      //carrierDelayMap
      carrierDelayMap.greaterThanDecorator_210 = greaterThanDecorator_21_3;
    }

@Override
    public void onEvent(com.fluxtion.runtime.event.Event event) {
      switch (event.getClass().getName()) {
        case
("com.fluxtion.scratch.fluxtion.flight.declarative.FlightHandler$FlightDetails"):
          {
            FlightDetails typedEvent = (FlightDetails) event;
            handleEvent(typedEvent);
            break;
          }
      }
    } public void handleEvent(FlightDetails typedEvent) {
      //Default, no filter methods
      isDirty_flightDetailsHandler_1 =
flightDetailsHandler_1.handleFlightDetails(typedEvent);
      if (isDirty_flightDetailsHandler_1) {
        isDirty_greaterThanDecorator_21_3 = greaterThanDecorator_21_3.onEvent();
        if (isDirty_greaterThanDecorator_21_3) {
          carrierDelayMap.updategreaterThanDecorator_210(greaterThanDecorator_21_3);
        }
      }
      if (isDirty_greaterThanDecorator_21_3) {
        isDirty_carrierDelayMap = carrierDelayMap.updated();
      }
      //event stack unwind callbacks
      afterEvent();
    }
```

Figure 19D-1

```
@Override
public void afterEvent() { isDirty_carrierDelayMap = false;
   isDirty_greaterThanDecorator_21_3 = false;
   isDirty_flightDetailsHandler_1 = false;
}

@Override
public void init() {
   greaterThanDecorator_21_3.init();
   carrierDelayMap.init();
}

@Override
public void tearDown() {}

@Override
public void batchPause() {}

@Override
public void batchEnd() {}
}
```

Figure 19D-2

Flight handler

```java
public class FlightDetailsHandler implements EventWrapper<FlightDetails>{
    private FlightDetails event;

@EventHandler
    public boolean handleFlightDetails(FlightDetails event){
        this.event = event;
        return true;
    }

@Override
    public FlightDetails event() {
        return event;
    }

@Override
    public Class<FlightDetails> eventClass() {
        return FlightDetails.class;
    }
}
```

Figure 19E

Greater than conditional processor:

```
public class GreaterThanDecorator_21 implements Wrapper<FlightDetails>{

//source operand inputs
    public FlightDetailsHandler filterSubject;
    public FlightDetailsHandler source_FlightDetailsHandler_20;
    private GreaterThan f;

@Initialize
    public void init(){
        f = new GreaterThan();
    }

@OnEvent
    public boolean onEvent(){
        return f.isGreaterThan((double)(
FlightDetails)source_FlightDetailsHandler_20.event()).getDelay(), (double)0);
    }

@Override
    public FlightDetails event(){
        return filterSubject.event();
    }

@Override
    public Class<FlightDetails> eventClass(){
        return FlightDetails.class;
    }
}
```

Figure 19F

Class grouping airlines by carrier name:

```
public final class GroupBy_28 implements GroupBy<CarrierDelay>{ public GreaterThanDecorator_21 greaterThanDecorator_210;
    private CarrierDelay target;
    private GroupByTargetMap<CarrierDelay, CalculationStateGroupBy_26> calcState;
    private GroupByInitialiser<FlightDetails, CarrierDelay>
initialisergreaterThanDecorator_210;

@OnParentUpdate( "greaterThanDecorator_210")
    public boolean updategreaterThanDecorator_210(GreaterThanDecorator_21
eventWrapped){
        FlightDetails event = eventWrapped.event();
        CalculationStateGroupBy_26 instance =
calcState.getOrCreateInstance(event.getCarrier(),
initialisergreaterThanDecorator_210, event);
        target = instance.target;
        {
                double value = instance.aggregateSum25;
                value = AggregateSum.calcSum((double)event.getDelay(),
(double)value);
                target.setTotalDelayMins((int)value);
                instance.aggregateSum25 = value;
        }
        {
                double value = instance.aggregateAverage23;
                value =
instance.aggregateAverage23Function.calcAverage((double)event.getDelay(),
(double)value);
                target.setAvgDelay((int)value);
                instance.aggregateAverage23 = value;
        }
        {
                int value = instance.aggregateCount24;
                value = AggregateCount.increment((int)event.getDelay(),
(int)value);
                target.setTotalFlights((int)value);
                instance.aggregateCount24 = value;
        }
        return true;
    }
```

Figure 19G-1

```
@OnEvent
public boolean updated(){
    return true;
}

@Initialise
public void init(){
    calcState = new GroupByTargetMap<>(CalculationStateGroupBy_26.class);
    initialisergreaterThanDecorator_210 = new
GroupByInitialiser<FlightDetails, CarrierDelay>(){

@Override
        public void apply(FlightDetails source, CarrierDelay target) {
            target.setCarrierId((java.lang.String)source.getCarrier());
        }

};
}

@Override
public CarrierDelay value(Object key) {
    return calcState.getInstance(key).target;
}

@Override
public <V extends Wrapper<CarrierDelay>> Map<?, V> getMap() {
    return (Map<?, V>) calcState.getInstanceMap();
}

@Override
public CarrierDelay event() {
    return target;
}

@Override
public Class<CarrierDelay> eventClass() {
    return CarrierDelay.class;
}
}
```

Figure 19G-2

A class defining the state of each grouped carrier item:

```
public final class CalculationStateGroupBy_26 implements Wrapper<CarrierDelay>{
    public CarrierDelay target;
    public double aggregateSum25;
    public AggregateAverage aggregateAverage23Function = new AggregateAverage();
    public double aggregateAverage23;
    public int aggregateCount24;

public CalculationStateGroupBy_26(){
        target = new CarrierDelay();
    }

@Override
    public CarrierDelay event() {
        return target;
    }

@Override
    public Class<CarrierDelay> eventClass() {
        return CarrierDelay.class;
    }
}
```

Figure 19H

EVENT HANDLING INSTRUCTION PROCESSING

FIELD OF INVENTION

The present invention relates to event handling instruction processing. In embodiments, the invention relates to methods and tools to enable efficient execution of event handling in computational processing apparatus.

BACKGROUND OF INVENTION

Computer software comprises instructions (code) for execution by the processor of a computing system. It is generally desirable for a processor to execute code rapidly, and in many contexts (gaming, trading, portable devices) it is desirable for code to be executed as rapidly as possible or for it to consume as little power as possible.

Well-written code that is logical and efficiently organised will assist in this, but it does not necessarily result in the fastest execution. The most logical structure in the code will not necessarily equate to the most efficient execution, as different events may take different lengths of time to process. In most computational environments processor design is general purpose—so not optimised to any particular computational task—but allows for some degree of parallel processing, which code may not be adapted to use effectively.

A particularly challenging area is stream processing. The ability to process streaming data in today's information rich society is critically important to both businesses and individuals. As a new piece of information is received the meaning of that information has a value—typically, the faster the meaning of the information can be inferred, the greater the value. For a stock price move, the quicker the effect that price move has on the value of a portfolio, the quicker a buy or sell decision can be made improving the chance of a better transaction price. Streaming applications work on the most recent data and do not try to process an entire historic data set. Processing the newest data only can lead to a faster response thus allowing a stream processing application to provide a speed advantage. In this context, any further reduction in latency when generating responses to incoming data events has the potential to increase value. The amount of streaming real-time data produced is exploding, as is the demand to process that streaming data and make real-time decisions. Traditional stream processing applications are now in great demand, and even though they are more efficient than other applications, any improvement in efficiency could provide even greater value.

One area where latency may arise is in event handling, where the code needs to address conditions that may arise and respond to them in a particular way. Where code needs to address a number of different conditions, as may often be the case in stream processing, providing reliably rapid processing poses a significant challenge. While stream processing solutions exist, these typically require the programmer to use an intermediate language (typically derived from relational algebra such as for SQL). Code in this intermediate language is then loaded into and interpreted by a stream processing server for processing of a data stream—for a full solution, this needs to be integrated with a client application to present information to the stream processing server and to process its output. This integration will typically need to be in a complete programming language such as C # or Java rather than an intermediate language for stream processing.

This conventional approach introduces considerable complexity both for developers and in execution of resulting code. It would be desirable to address this issue to allow event handling code to operate at reliably high speed while providing simple and effective processing of events without introducing complexity in code development or execution.

SUMMARY OF INVENTION

In a first aspect, the invention provides a method of providing instructions to computer processing apparatus for improved event handling, the method comprising: providing instructions for execution on the computer processing apparatus to an event processor generator, the instructions comprising a plurality of functional steps, a set of dependencies between the functional steps, and configuration data; the event processor generator creating instances of the functional steps from the instructions and representing the instances as directed acyclic graphs; the event processor generator identifying a plurality of event types and topologically sorting the directed acyclic graphs to determine a topologically ordered event path for each event type; and the event processor generator providing a revised set of instructions for execution on the computer processing apparatus in which original instructions have been replaced by instructions requiring each event type to be executed according to its topologically ordered event path.

This approach enables code to be produced that handles events in a far more efficient way than is achieved in conventional stream processing, though embodiments of the invention can be used in many other contexts to provide greater speed or more efficient use of resources.

Preferably, the revised set of instructions is adapted to invoke a subset of functions in a repeatable order when a specific event is identified by the computing apparatus. This repeatable order may be such that no dependent function is invoked before its parent.

In some embodiments, the revised set of instructions may generate a state machine, where an internal state of a node changes based on an incoming event.

In many cases, the revised set of instructions is adapted to handle multiple event types, wherein a specific processing chain is determined for each event type, wherein a processing chain is a plurality of functions invoked in a repeatable order. One or more helper functions may be used to create part or whole processing chains.

The revised set of instructions may provide conditional branching, such that subsequent functions are only evaluated when a preceding function for that subsequent function indicates that a change has occurred.

The revised set of instructions may provide event identification, wherein a function receives notification which of its parent functions has updated.

The revised set of instructions may provide value filtering, such that at least one branching event is based on both event type and values in the event.

One or more of the functions may be provided declaratively. One or more functions may be provided in conjunction with a set of factories.

In embodiments, providing instructions for execution on the computer processing apparatus to an event processor generator may comprise only providing a plurality of functional steps, a set of dependencies between the functional steps, and configuration data, all without any graph description, and wherein the event processor generator may then infer a graph description for creating instances of the functional steps from the instructions. In embodiments, in creating instances of the functional steps from the instructions, the event processor generator may infer execution paths from the plurality of functional steps and associated metadata.

The revised set of instructions may comprise event processor code for processing one or more events suitable for compilation with other code for execution on the computing apparatus. Such event processor code may be adapted for inclusion with a client application to act as an event processor for that client application. This event processor code may be in a target language different from a language used in the event processor generator. In some cases, the event processor code may have one part in a first target language and another part in a second target language—this would allow using specific hardware functions that may not be available in the first target language.

In a second aspect, the invention provides computing apparatus comprising a processor and a memory, wherein the memory comprises code which when performed by the processor carries out the function of an event processor generator for carrying out the method of providing instructions to computer processing apparatus described above.

In a third aspect, the invention provides a storage medium with event processor code prepared by the method described above stored thereon.

In a fourth aspect, the invention provides computing apparatus comprising the storage medium described above and a processor adapted to execute the event processor code in the storage medium.

BRIEF DESCRIPTION OF FIGURES

Embodiments of the invention will now be described, by way of example, with reference to the accompanying Figures, of which:

FIG. 8B shows exemplary pseudo code in relation to FIG. 8A showing how the process model is specified in a general programming language such as Java;

FIG. 8C indicates a table showing the processing order of functions for a particular event as defined in the model of FIG. 8A;

FIG. 8D shows pseudo code generated by an event processor generator according to an embodiment of the invention for integrating and compiling with a client application.

FIG. 16A shows an exemplary word counter implementation showing operation of an embodiment of the invention, demonstrating both filtered and non-filtered event handling, and FIG. 16B shows an exemplary generated class, adapted to execute rapidly on a Java Virtual Machine, associated with this implementation;

FIG. 18A shows code to provide a Boolean result to condition the notification of children for the example of FIG. 17, with a resulting event handling output shown in FIG. 18B and FIGS. 19A to 19H show code to provide an exemplary calculation of average flight delay per airline using declarative provision of input functions

DESCRIPTION OF SPECIFIC EMBODIMENTS

Figure 13:
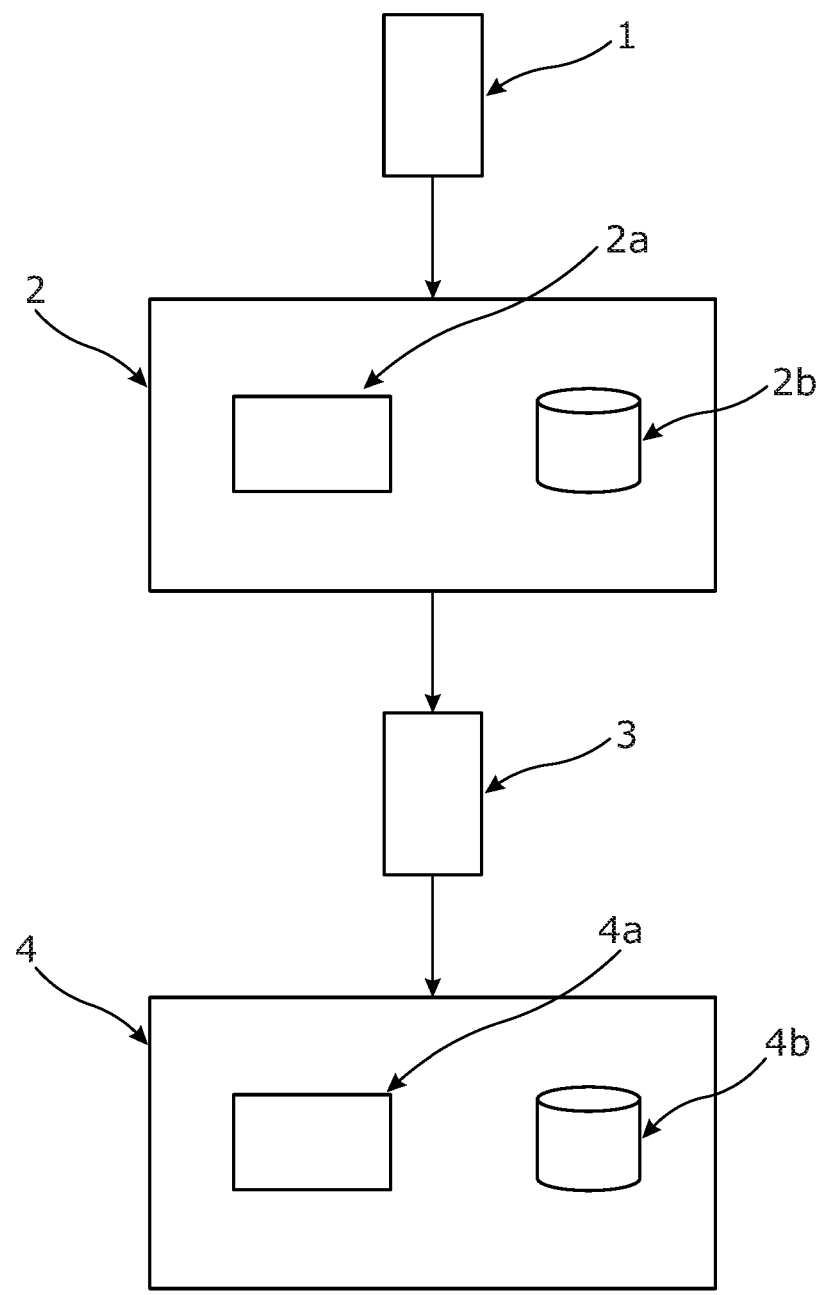
FIG. 13 shows a computing environment suitable for processing of event handling code according to embodiments of the invention.

FIG. 13 shows elements of a computing environment appropriate to performing embodiments of the invention. In embodiments of the invention, code 1—typically in embodiments described for stream processing (as defined at https://en.wikipedia.org/wiki/Stream_processing, for example, and involving a sequence of data and a series of operations for applying to the data, generally allowing some measure of parallel processing)—is provided to an event handling analyser 2 (which may be any suitable computing apparatus comprising a processor 2a and a memory 2b adapted to store and execute event handling analysis code 2c) which provides modified code 3 for execution on a running system 4 (again, any suitable computing apparatus comprising a processor 4a and a memory 4b adapted to run the modified code 3). The event handling analyser 2 need not be adapted to run the modified code 3, and the running system 4 does not need to refer back to the event handling analyser 2 to run the modified code 3.

Figure 1:
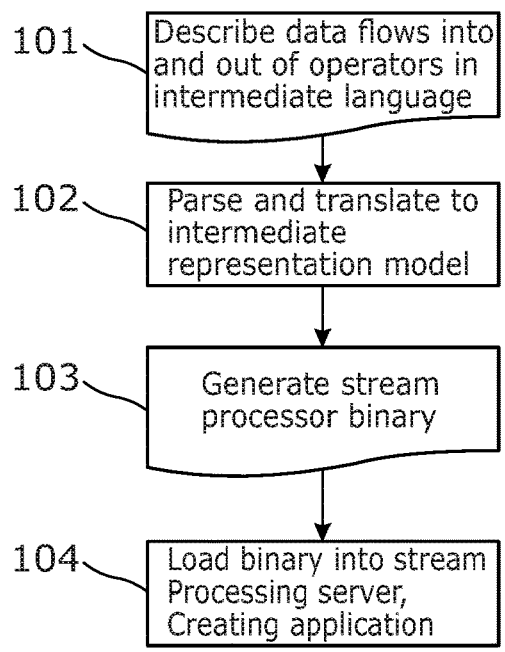
FIG. 1 is a block diagram showing how prior art stream processing applications are defined and implemented.

FIGS. 1, 2, 3A and 3B show conventional approaches to stream processing that are used in the prior art. FIG. 1 outlines a conventional approach to stream processing. An intermediate language is used to describe data flows 101 with respect to operators. The data flows in the original code are parsed, and translated into data flows in an intermediate representation model 102. This intermediate model is used to develop binary code representing this intermediate representation 103. To create the working application, the binary code is loaded into a system adapted to run it (for example, a stream processing server) and executed 104.

Figure 2:
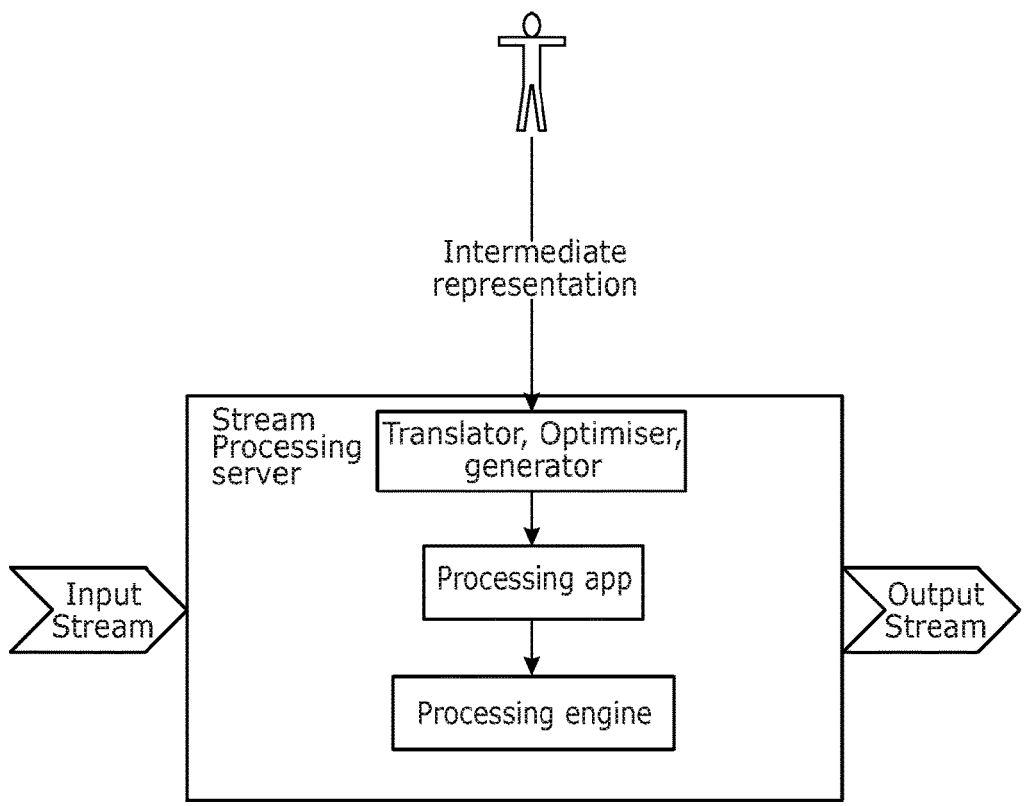
FIG. 2 is a block diagram showing how prior art stream processing platforms are integrated into running systems.
Figure 3A:
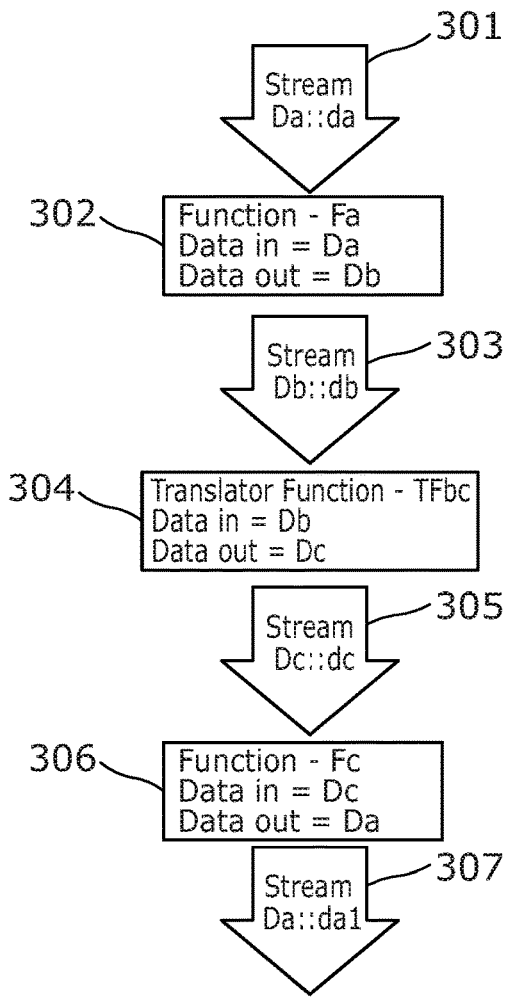
FIG. 3A is a block diagram showing the processing of data streams by functions in prior art systems.
Figure 3B:
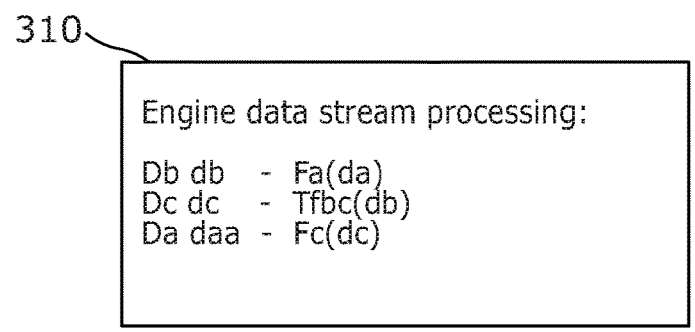
FIG. 3B shows pseudo code indicating the processing of data streams in prior art systems.

A conventional stream processing system is shown in FIG. 2. A stream processing server 201 is adapted to receive an intermediate representation 202, and can convert an input stream of events into an output stream of handled events. To do this, the stream processing server 201 receives the intermediate representation 202 into a translator 211, which translates the intermediate representation, determines how to optimise it for execution as a stream and generates code for execution by the stream processing server 201. The input stream 221 is received by a stream processing application 212 using a stream processing engine 213 implementing the code effecting the intermediate representation, and processes it to form an output stream 222.

As shown in FIG. 2A, stream processing typically takes a function-by-function approach. Firstly the input stream 301 is processed 302 for function Fa, with input data Da processed to provide output data Db. The resulting intermediate stream 303 is then processed 304 for function Fb, with input data Db and output data Dc in a further intermediate stream 305, subsequently processed for function Fc with output stream 307, and so on. FIG. 2B shows exemplary pseudo-code 310 for this type of stream processing process.

Figure 14:
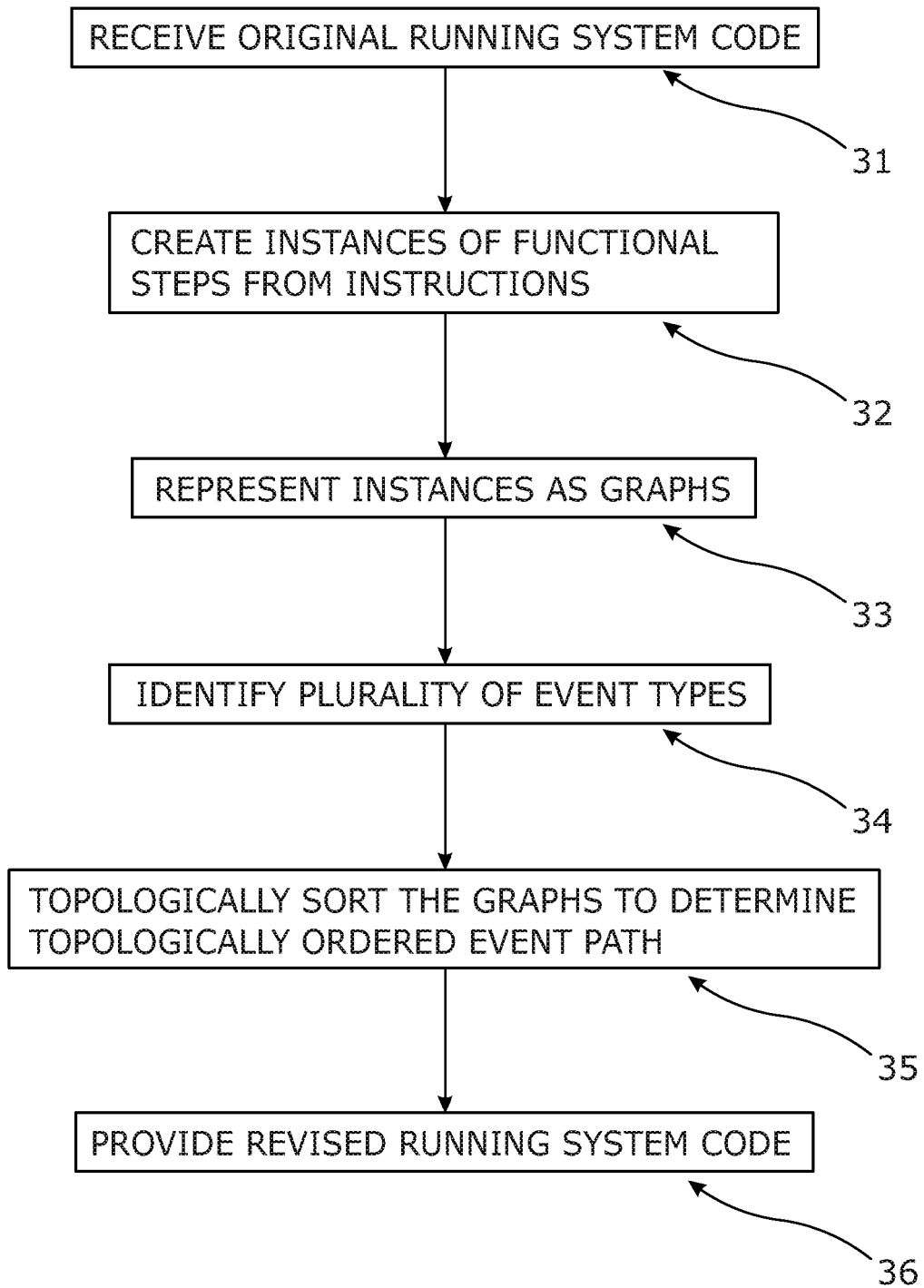
FIG. 14 shows an approach to modifying event handling code according to embodiments of the invention.

FIG. 14 shows, in general terms, a new approach to event handling, and applicable to stream processing, in accordance with embodiments of the invention. A method of providing instructions to computer processing apparatus for improved event handling comprises the following steps, as shown in FIG. 14.

Firstly, an event processor generator receives 31 instructions for execution on the computer processing apparatus. These instructions may comprise a plurality of functional steps, a set of dependencies between the functional steps, and configuration data.

The event processor generator creates 32 instances of the functional steps from the instructions and represents 33 the instances as graphs. The intention is for the instances to be represented as directed acyclic graphs (DAGs).

The event processor generator identifies 34 a plurality of event types and topologically sorts 35 the graphs to determine a topologically ordered event path for each event type in the form of a directed acyclic graph.

The event processor generator then provides 36 a revised set of instructions for execution on the computer processing apparatus in which original instructions have been replaced by instructions requiring each event type to be executed according to its topologically ordered event path.

Figure 4:
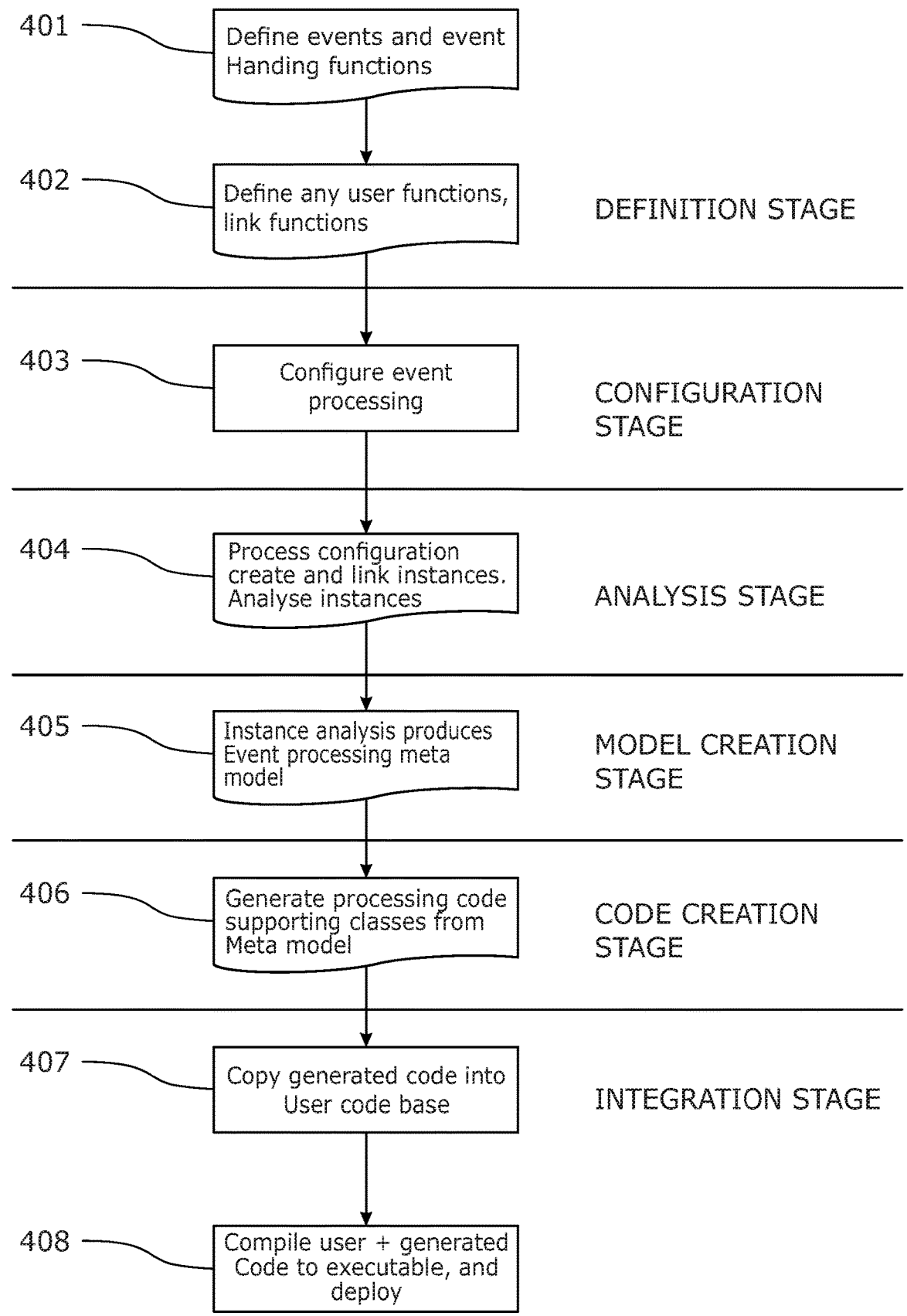
FIG. 4 is a block diagram showing how an event processor generator according to an embodiment of the invention can generate source code to process incoming events.

This process is discussed in more detail for particular embodiments with reference to FIG. 4. An approach to generation of source code for integration into applications by an event processor generator (in this case, a computer system adapted to generate event handling source from appropriate inputs) involves several stages: definition, configuration processing, analysis, model creation, code generation and integration. A user of the event processor generator system is responsible for creating the definition and for presenting that definition to the event processor generator. The event processor generator then carries out the succeeding stages: configuration processing, analysis, model creation and code generation. The user will then be responsible for integrating the output of the event processor generator wherever it is to be used—typically as part of running code implemented on another computer system altogether. It is possible in some embodiments for the user to configure the system to produce a fully functioning application, in which case the integration phase is not required. The event processor generator system uses the instance model generated in the configuration phase as an input to the analysis and model phases. These phases will now be discussed in greater detail in turn with reference to FIG. 4.

Definition Phase—

The user defines the input into the event processor generator system (401, 402) for processing. The user states what events it is necessary to process and how functions should be linked together. The user can present this definition in several different ways (either singly or in combination) to the event processor generator system:

- Imperative form (i.e. in standard code using a language such as Java).
- Declarative form. This may again use a language like Java, but with use of library functions to define the processing (this could be considered akin to use of SQL, but the event processor generator system does not require the user to employ a separate programming language).
- Configuration driven. The user may supply configuration to the event processor generator system defining what instances to create and how to link them together. Instance factories are registered with event processor generator system, and will create instances during the configuration phase for later processing.

Examples of these different types of input are discussed below.

Figure 8A:
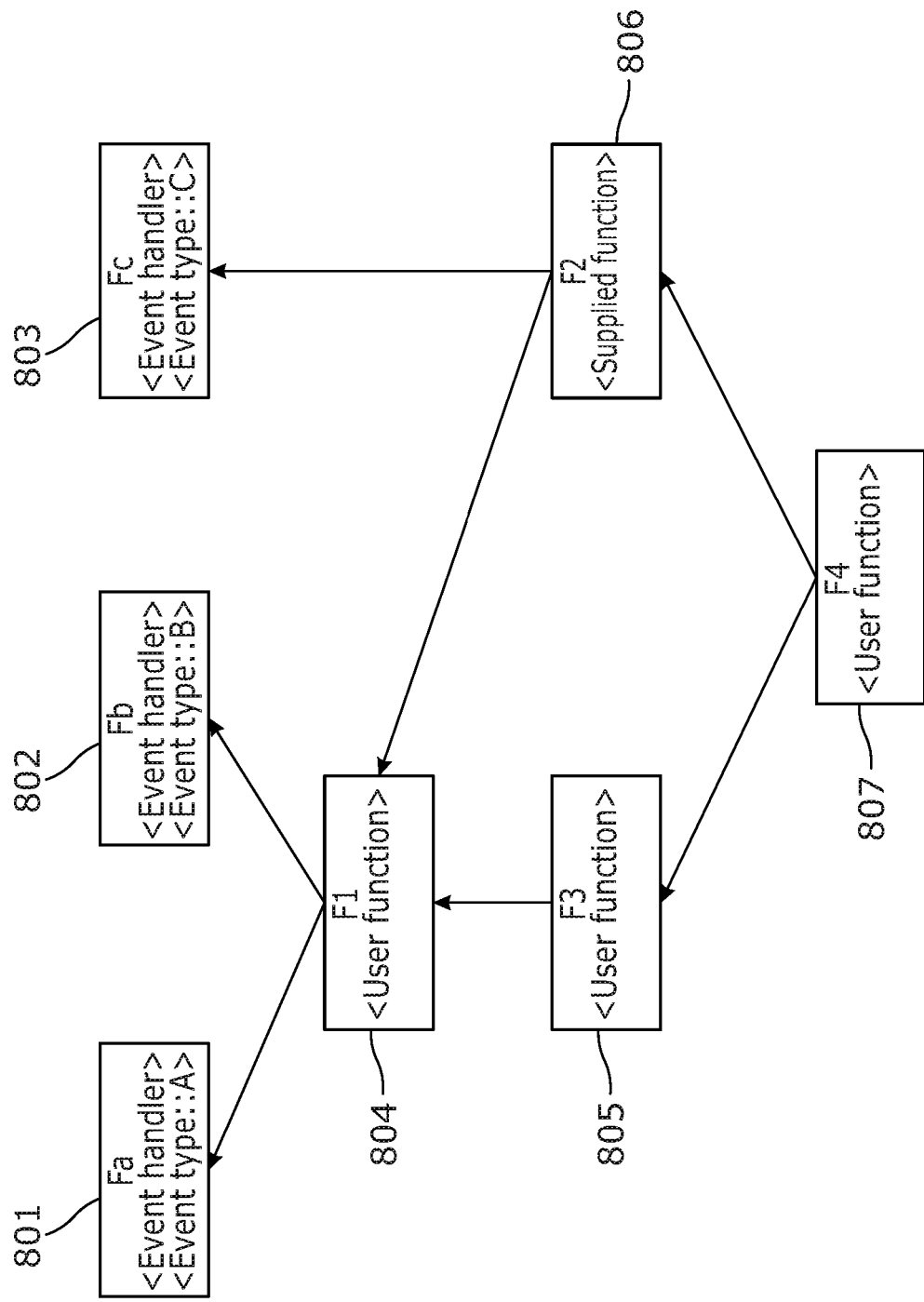
FIG. 8A is a block diagram showing how an event processor generator according to an embodiment of the invention processes events with particular reference to the hierarchical relation between dependent functions.

An imperative example of user supplied definition can be seen in FIG. 8B. The user wants the invention to create a system that exhibits the characteristics defined in the table in FIG. 8C. FIG. 8C shows that for each event type received there is a defined processing order of functions. The same processing can be represented graphically in FIG. 8A. As can be seen from FIG. 8A, there are several functions that are provided either by the user or by the system, and each function has a reference to the preceding function or functions. In effect (and in this specific case), there is a directed acyclic graph (DAG) of functions. At the root of the graph is a special function termed an eventhandler (eh) that handles an incoming event. There can be many such functions eh within a single graph. If an eh function is a proxy for an event, then a specific event will equate to a unique path on the DAG where the nodes on that path are the functions succeeding the eh. If each function is executed in the order defined in the event path, this will correspond to an execution path. In consequence, the set of events to be handled will produce the table of FIG. 8C when considered in terms of events and functions to execute or an execution path.

This approach is implemented particularly effectively in an object oriented language. In an object oriented language, functions exist within classes, and a class can house multiple functions. Classes can have references between themselves, so using that reference allows a function on an instance of a class to be executed by another instance that holds a reference to the function holding class. As a class can have many functions, the user can indicate to the event processor generator system which functions are on the execution path by providing metadata (such as annotations in Java) to mark a method for event processing.

By constructing the code as show in FIG. 8B, it is possible for an event processor generator system to create a DAG and then the execution path for each event type. It can be inferred that any reference from a child instance to the parent instance implies the order of processing, i.e. all the parent event functions must be executed before the child event function is executed. Some programming languages provide facilities to inspect the object graph—in Java. this is known as "reflection". Event processor generator systems according to embodiments of the invention use reflection for full exploration of the object graph—this removes the need for the user to define the DAG separately.

In the state of the art approach, the user would define the processing graph and the order of processing in a separate graph description language for processing by a runtime system. Such a graph description language is bespoke and directed to this specific purpose, and so will be quite separate from the user's normal programming language. In such an arrangement, it is the responsibility of the user to ensure that the graph description and functions provided to the system are consistent with the desired behaviour. As can be seen from FIG. 2, the graph description is sent by the user to a generic event processing system (eps) to create the desired event processing behaviour. The eps processes the graph description resulting in dynamic changes to its runtime behaviour. The eps decides what functions to invoke when an event is received and provides overall control of the runtime system. Any events to be processed are sent to the eps, as this is the central point of the system. Consequently, in this state of the art approach the process server system must be present during runtime for the overall system to function.

The approach taken using embodiments of the present invention is fundamentally different from the event process server approach. In particular, the event processor generator system is used at build time and need not be (and generally will not be) present at runtime. Significant differences are as follows:

1. The event processor generator system produces a set of code that exhibits the desired behaviour. This code can then be incorporated into the user system and the functionality would also be incorporated in the larger system. At this point there is no further need for the event processor generator system and the user would still have a fully functioning system that would last in perpetuity. This approach is markedly different from the existing state of the art—as the eps is needed at runtime, if it were to stop functioning or its license expire the functionality would be lost to the wider system.
2. In embodiments of the present invention, the graph description is inferred and there is no need for the user to create a graph description as in the state of the art. This prior art approach is likely to lead to errors, and may even prove intractable for a user dealing with larger problems that have complex graphs.
3. The execution paths are inferred by the event processor generator system through metadata attached to a function. This means a user does not need to reason about the whole graph—it is only necessary to mark a function as being on the event path. In the state of the art approach, the user must provide all the execution methods in the graph as a separate description, with the danger that this may be inconsistent with the graph description.
4. As the graph definition is discovered by the event processor generator system in embodiments of the present invention, the event processor generator system can create the most efficient processing path for any event to be processed by applying optimisation algorithms. This is a task that would not be tractable for a person dealing with any problem involving more than a handful of nodes. However, such an event processor generator system can handle millions of nodes and produce optimal execution paths. Moreover, because the state of the art approach does not examine the whole object graph, it cannot perform a global optimisation—it can only work with the information the user provides.
5. In the state of the art approach, writing the graph description is time consuming. It is also static in nature, leading to discontinuities if the system is updated by adding or removing processing functions. In the state of the art approach a user may add the nodes but forget to update the graph description, or incorrectly update the graph—either would lead to errors in the application behaviour. The approach taken in embodiments of the present invention would allow examination of the new functions and production of an optimal solution for the new graph, preventing any errors entering the application.
6. Because the code is being generated at compile time and the problem can be bounded, it is possible to build many optimisations into the output in a way that a state of the art eps could not reproduce. As such an eps must maintain that dynamic capability to load new event processing graphs, it cannot optimise effectively for bounded problems. For example, the user may define a matrix multiplication: the approach according to embodiments of the invention can optimise this, as the sizes of the matrices are fixed at compile time; due to the dynamic nature of an eps that information is lost, and the matrix optimisation cannot be performed.

Configuration Phase—

The style of processing is configured by the user to alter the generated output (403). Options that can be controlled include:

1. The target language for the generated code. For example, the input to the model may be Java, but the output could be C++.

2. Different templates for the generated code can be specified producing generated code that has specific characteristics desired by the user.
3. The user can control the generation of conditional branching support in the generated code.
4. Additional artefacts can be generated, such as a debug version of the processing model, or a diagram of the execution paths.

Other configuration data may be provided that relates to the processing environment for the event processor code. For example, the event processor generator can generate multi-threaded or distributed processing that can be deployed over multiple machines or cores on a single machine. It is specified at the configuration phase if target code should be single threaded, multi-threaded or distributed.

The configuration and the definition are passed onto the analysis stage for further processing.

Analysis Phase—

For the event processor generator system to carry out its analysis (404) it needs to create an object graph of instances the user has provided in the definition stage; it is this object graph the invention will analyse. The configuration information declares how to use the definition to create an object graph. An object graph may be defined as follows (with reference to https://en.wikipedia.org/wiki/Object_graph):

"In computer science, in an object-oriented program, groups of objects form a network through their relationships with each other—either through a direct reference to another object or through a chain of intermediate references. These groups of objects are referred to as object graphs.

An object graph is a view of an object system at a particular point in time. Whereas a normal data model such as a UML class diagram details the relationships between classes, the object graph relates their instances. Object diagrams are subsets of the overall object graph.

Object-oriented applications contain complex webs of interrelated objects. Objects are linked to each other by one object either owning or containing another object or holding a reference to another object. This web of objects is called an object graph and it is the more abstract structure that can be used in discussing an application's state."

At the beginning of the analysis phase, the event processor generator system holds the object graph and the set of instances that are to be part of an execution path. Reflection is then used to navigate and analyse the object graph. Similar approaches may be used in connection with other languages, but reflection is particularly effective in Java. Java reflection is a process of examining or modifying the run time behaviour of a class at run time. The java.lang.class class provides many methods that can be used to get metadata, examine and change the run time behaviour of a class. The java.lang and java.lang.reflect packages provide classes for Java reflection.

The event processor generator system starts analysing each instance in the set of instances in the execution path using reflection. The analysis creates a new event graph as a product of the analysis. This event graph is added to with the following logic:

1. Add the instance to the event graph as a node if it is missing from the event graph, giving the instance a unique name.
2. Inspect each reference from the instance.
3. If the reference points to an instance in the execution path, add the target of the reference to the event graph as node if it is missing. If there is no vertex from this instance to the referenced instance, add a vertex from the current node to the referenced node in the event graph.
4. For each node added, continue with the same inspection recursively by moving to step 2 until all references have been examined.

Figure 5:
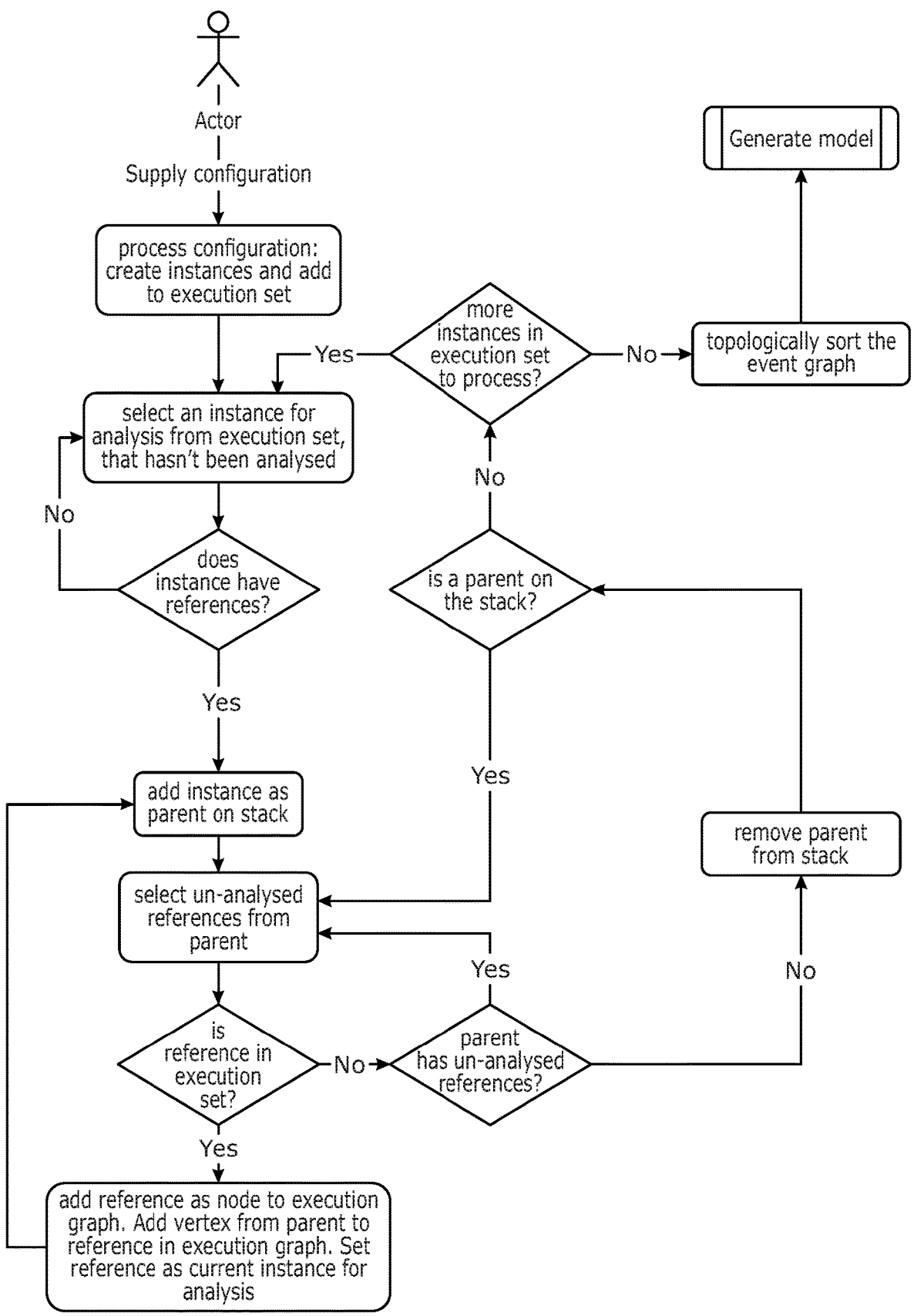
FIG. 5 is a flow chart showing how a definition of the system provided by the user may be analysed in an event processor generator according to an embodiment of the invention.

All the instances that are in the execution path will now be in the execution graph as nodes, and the references between them are modelled as vertices. The graph will however be in a random order—a topological sort is then performed on the graph to ensure the instances are in execution path order and ready for model creation. FIG. 5 illustrates the analysis stage with a flow chart—FIG. 5 provides additional detail of steps that may be taken in the analysis stage in a self-explanatory form.

The topological sort is to ensure that the execution graph is a Directed Acyclic Graph (DAG), if this property is not already present in the event graph. A DAG is a well-understood mathematical entity—a graph with finite vertices and edges in which there is no possible loop from one vertex v to the same vertex v. Should the graph not be a DAG, appropriate measures are taken so that it can be represented as a graph (typically, this will be redefinition of the features that are causing there to be cyclicity in the graph). A requirement of a DAG is that it is a finite graph with no directed cycles, and such a graph can always be topologically ordered—there is a sequence of the vertices such that every edge is directed from earlier to later in the sequence—and algorithms to find the topological ordering of a DAG are well known to the person skilled in the art. Another approach is to iterate through the graph in topological order.

Taking this approach allows a sequence of tasks to be scheduled according to their dependencies—a particularly suitable (in some cases, optimal) path is created. This improved path is used to create a new set of instructions.

In embodiments, a class TopologicallySortedDependecyGraph (TSDG) is established which is adapted to sort a received node graph topologically to provide an improved event path for an event processing model. The TSDG is provided with a set of nodes, or a set of factories with configuration that can be used to generate the nodes in the graph. At this point there may be a complete set of nodes in the graph but with no vertices specified and the functions stored in a global list.

The actual topologically sorted DAG is created with the generateDependencyTree( ) function call. If a configuration is provided, then factories may be used to create instances of functions and linked to other functions. Any instances created are added to the global list. There now exists a set of function instances and the dependencies between those functions as a standard object graph, the system can use this object graph to create the topologically sorted DAG.

An object graph, as discussed above, is a group of objects which form a network through their relationships with each other—either through a direct reference to another object or through a chain of intermediate references. This is a view of an object system at a particular point in time. In object-oriented applications, objects are linked to each other by one object either owning or containing another object or holding a reference to another object. This web of objects is the object graph and it is an abstract structure that can be used in discussing an application's state.

The TSDG invokes a function walkDependencies([instance]) for each instance in the global list of functions. This function operates as indicated above—it uses reflection to interrogate the object graph in order to map the object graph into a new graph data structure ready for sorting.

walkDependencies determines the dependencies of the instance it is processing. If a dependency is located in the global function list, then a node and vertex is added to the graph. walkDependencies is a recursive function, so any dependency that is in the global function list is now passed to the walkDependencies function for processing.

It is possible for functions to be created dynamically in the first pass of walk dependencies, because factories may be used that actually generate code that is compiled and an instance is created. For such dynamically generated nodes they are can only be added to the global function list when they are created. For this reason another pass of the walkDependencies function is invoked.

As noted above, at this point all the functions should be in the graph, but in a randomly sorted order. The topological sort is then performed on the graph. The TSDG now holds the sorted graph and provides accessor functions to the graph plus additional utilities for the next stage in the process.

Model Creation Phase—

In the model creation phase (405), the event processor generator system creates an event processing model (epm) of the system to be executed. This epm is interrogated in the code generation phase. Using the execution graph provided by the analysis and the execution instance set from the configuration, the event processor generator system creates a model of each specific characteristic that is required in code generation.

Using reflection, the event processor generator system discovers any lifecycle methods for instances in the graph. A lifecycle method is invoked in response to non-event based actions. For example, an instance may have an initialisation function that will be invoked by the event processor generator system before any events can be processed. The lifecycle methods are marked with metadata such as annotations in the Java language. The set of lifecycle methods for each instance is stored for later use in the code generation phase.

Again using reflection, the event processor generator system discovers any event processing methods for instances in the graph. Exemplary event processing methods will include:
1. AfterEvent—Notifies nodes when all event processing has completed. This is invoked in reverse topological order.
2. OnEvent—Notifies nodes when all their dependencies that are in the execution path of the incoming event have completed processing. This is invoked in topological order.
3. EventHandler—Notifies the root of the object graph that a matching event has been received and is ready to be processed.
4. OnEventComplete—Inverse of the OnEvent callback, notifies nodes that all OnEvent handlers are completed for a particular matching event. This is invoked in reverse topological order for a particular event execution path.

To produce a model of the event processing, the following algorithm is performed, using reflection to ascertain metadata:
1. The root of an execution path is a method marked with meta-data as an EventHandler (eh).
2. The event processor generator system loops through the instances and uses reflection to find any instance marked with meta-data as an eh. For each eh discovered the following is carried out:
    2.1. Using the topologically sorted graph a path is selected with the eh as the root, the nodes on the path represent the instances to invoke for a specific event, and the order they should be executed in.
    2.2. Again using reflection the event processor generator system discovers any event response methods on the instances in the execution path and stores the function methods in topological order. The event processor generator system searches for the following response methods: AfterEvent, OnEvent and OnEventComplete.
    2.3. For each eh there will be an execution list for each response method type, these lists are added as values to an event dispatch map where the eh is the key.
    2.4. If two event handlers handle the same type of event the execution lists are merged, maintaining topological sorted order.

Figure 6:
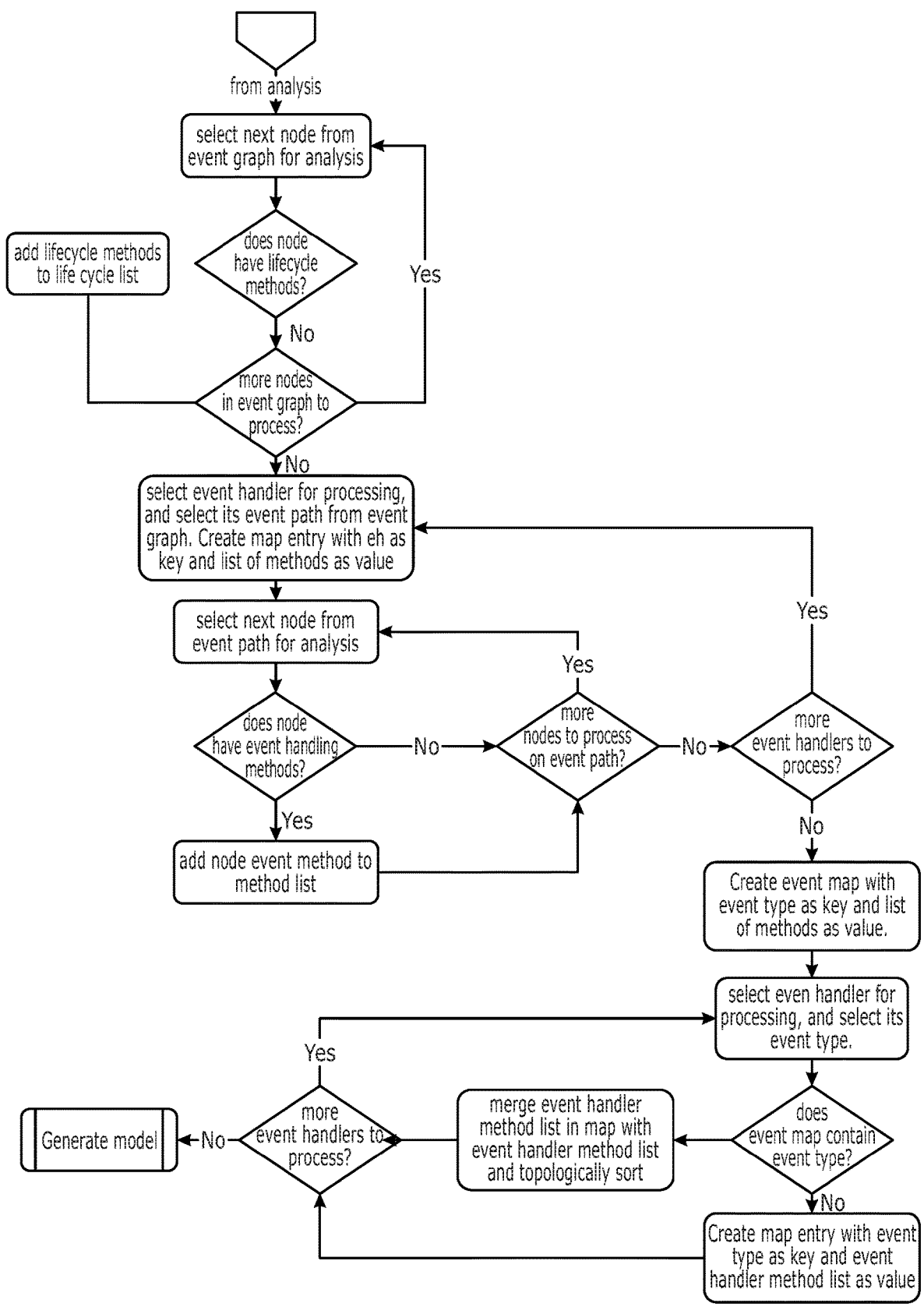
FIG. 6 is a flow chart diagram showing how an event processor generator according to an embodiment of the invention can create a model of the event processing using the results of an analysis phase as shown in FIG. 5.

At this point the model has completed its work, and the following information is stored for retrieval by the code generator: unique names for instances, a list of lifecycle methods, a map of lists of event response methods for each response type in topological order, wherein the key of the map is the event type. The code generator will use this model to generate the code. A flow chart for model creation is seen in FIG. 6, again with additional detail of steps that may be taken in the model creation stage in a self-explanatory form.

Code Generation Phase—

In the code generation phase (406), the event processor generator system interrogates the model and generates an optimal event processing set of source code that is ready for integration into the user's system. The target language for the code generation will have been set at the configuration stage and the language template is selected for that target. The code generator will perform the following steps:
1. Loop through the lifecycle methods and generate code for each lifecycle method as a separate function.
2. Loop through the nodes and create declarations with the unique name the instance was given when placed in the execution graph.
3. Assign references between instances—the references are the vertices in execution graph.
4. For each eh in the dispatch map, create a method that will handle the specific event. In the event handler method, invoke each event response method as specified in the list stored in the event dispatch map for the eh key. OnEvent methods are invoked first, and then OnEventComplete methods, followed by the AfterEvent methods.

The generated source code will be written to file with a name as specified in the configuration—it is now ready for integration in the user's application.

Figure 7:
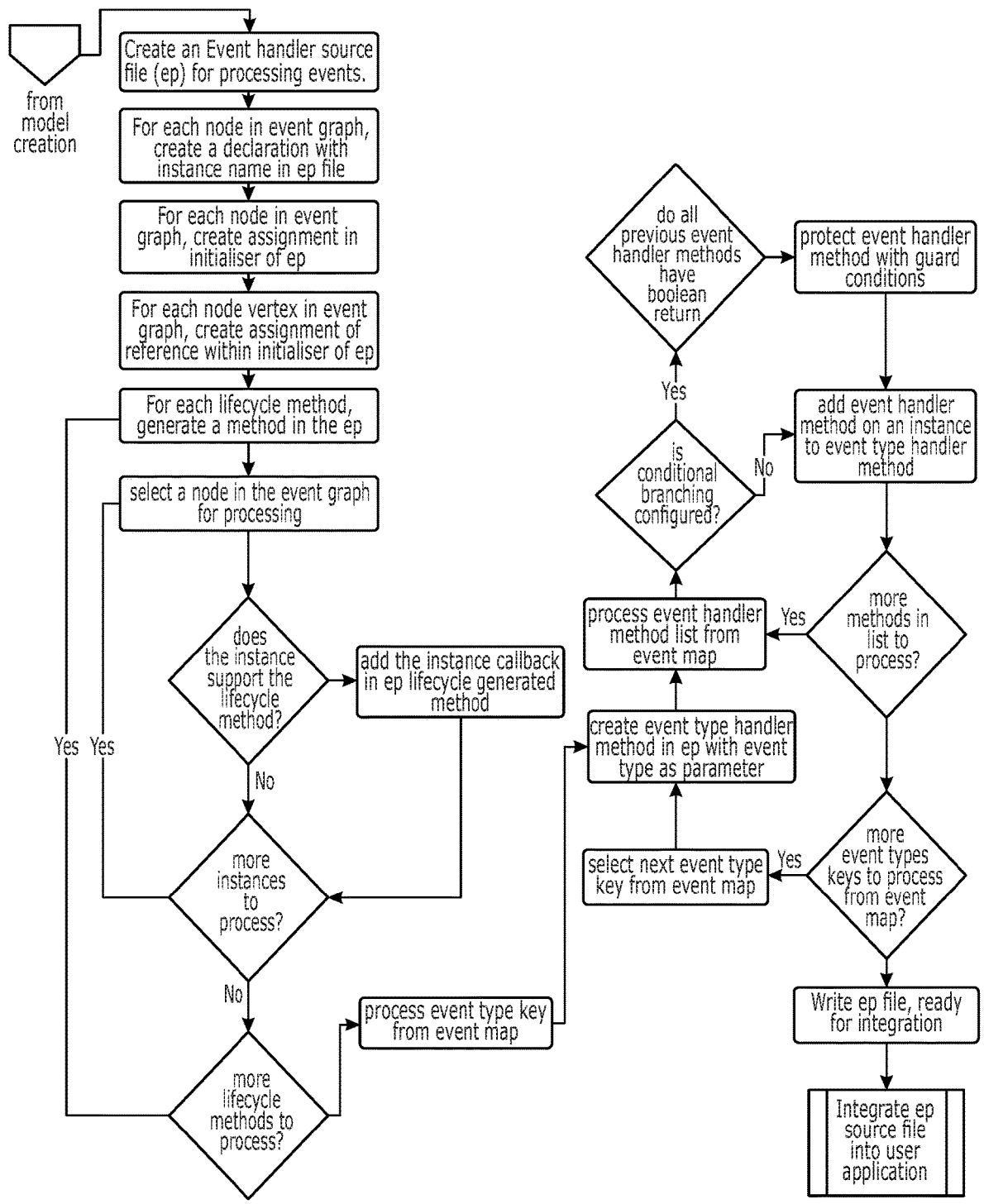
FIG. 7 is a flow chart diagram showing how an event processor generator according to an embodiment of the invention can create event processor generator source files from the results of the model creation phase as shown in FIG. 6 in a form ready for integration into running code.

If configured accordingly, the source code generated can be a complete application and will not require integration into a user application—only compilation needs to occur for an application to be created. The flow chart for model creation is FIG. 7—detail is provided in self-explanatory form of additional steps that may be carried out in the model creation process.

At this point the event processor generator system is no longer required and only integration needs to be completed.

Integration Phase—

In the integration phase (407,408), the user compiles the generated source code with the user's own code to produce an executable binary. This could take place either manually or automatically depending on requirements. The user may decide to discard the source code and only keep the compiled output. It is also possible if desired for the user to compile the source code in process with the application and load the compiled binary into the application—this allows the user to produce dynamic event handling behaviour as exhibited by an eps.

Further discussion of aspects of particular embodiments of the event processor generator system is provided below.

In embodiments, the event processor generator system processes events and data in a novel fashion. In a state of the art approach, functions process data changes by receiving the data they will process as a method parameter, perform a calculation using that data and then return the result as a new return value from the method—such data holders are often called "tuples". The prior art eps is responsible for tying the tuple together with the function method, and in some cases transforming the tuple from one form to another.

An event handling processing system of embodiments of the present invention does not use tuple passing. As each instance has a reference to its predecessor, the currently calculating function can request any information it needs from its parents to carry out the calculation. Each function is notified that it is its turn to calculate via its onEvent method, but no data is sent to the function. The generated code ensures all the references between instances are set correctly before event processing can commence, the correct execution path is selected for an event and the functions on the execution path are invoked in the correct order. This approach can bring huge efficiencies compared to the state of the art approach for the following reasons:
  1. Tuples are often immutable, which requires a new tuple to be created in each function to hold the result of the calculation. This creates work for the machine and puts pressure on the memory sub-system.
  2. In a memory managed runtime like Java, tuple passing will create pressure on the garbage collector, as the redundant tuple instance will have to be disposed of and the memory reclaimed when there is not enough memory available to the system for correct functioning.
  3. In some languages like Java, primitive types must be wrapped in objects. This creates work for the machine and consumes memory.
  4. If an object is placed in the tuple, a defensive copy will be made of the original object and the copy placed in the tuple. This defensive copying creates pressure on the garbage collector processor cache as more memory is being consumed.
  5. Sometimes tuples require conversion from one data type to another—this creates work for the machine.
  6. When a tuple is created memory is consumed every time a function is invoked, eventually causing the processor to push older data out of its nearest cache. If data evicted from the cache is required later in the processing, then the processor must wait while that data is retrieved from a slower data store, such as main memory—this can be 10 to 1000's of times slower than the nearest processor cache.

The use of tuples thus puts pressure on a system in several ways. Using the processor cache inefficiently pushes out older data more quickly, creating delays if the older data is required at some later stage. Pressure is being built on the memory subsystem so that at some point this pressure will need reducing and the garbage collector will run to reclaim memory. Running a garbage collection uses processor cycles, consumes energy and may even pause the whole eps. The pressure on the garbage collector is proportional to the number of messages flow per unit of time, and the number of functions in the graph. Consequently, the greater the rate of events received, the more likely a pause in the processing—unfortunately, in highly volatile situations the capability to infer the meaning of data is at its most valuable.

Because the event handling processing system does not use tuples, the processor cache is used more efficiently and events can be processed without consuming any new memory, so less data is pushed out of cache. As well as using the cache more efficiently, cycles are not wasted on creating new tuples, converting data and running garbage collections. This leads to a 10-100 times improvement in performance over the state of the art approaches. Such improvements can result in reduced energy consumption, longer battery life and increased capacity to handle more data on the same hardware.

Embodiments of the event handling processing system support conditional event processing. It is sometimes the case that no further events should be processed on the execution path if certain conditions are not met. Consider a high temperature alert that depends on a barrier condition which in turn depends upon a temperature event handler. If the barrier condition is not breached there should be no alert. The alert function when invoked could ask the barrier if a breach condition occurred before deciding whether to issue an alert.

Such logic can be error prone and places unnecessary burden on the programmer as this function is manually written. The event handling processing system of embodiments of the invention can use a Boolean return value from the parent function to indicate that a change has occurred—if this is the case, the alert function will be invoked, otherwise the alert function will not be called depending upon the Boolean return value of the barrier function. The event handling processing system uses reflection to decide if a child function should only be invoked conditionally. All the programmer needs to do is to ensure the barrier function returns the correct Boolean value—the alert function no longer needs the conditional logic written by the programmer. To provide the conditional support the event handling processing system uses the following algorithm:
  1. Loop through all nodes in the execution graph, for each instance in the execution graph:
     1.1. Collect all the parents of this instance and check the return types of each parent onEvent function. Determine through reflection if a parent function returns a Boolean value, if all parent functions return a Boolean value then mark this function in the model as conditionally branched.
     1.2. When generating code assign a local Boolean variable to the return of the event function if it returns a Boolean value.
     1.3. If the model indicates an onEvent function is conditionally branched, only invoke this function if one of its parents indicates a change has occurred through a positive Boolean return value.

Figures 10A, 10B:
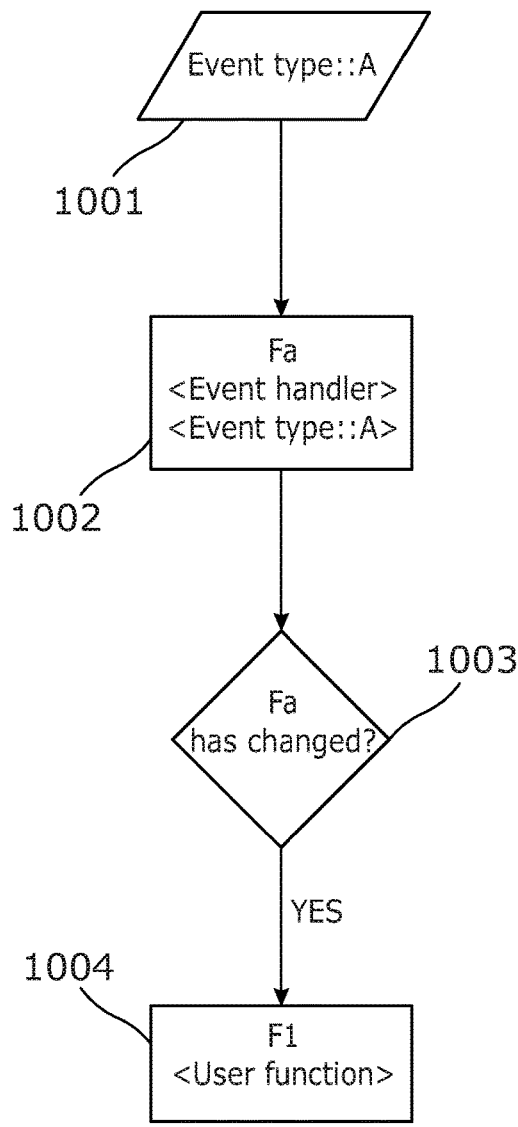
FIG. 10A is a block diagram showing how an event processor generator according to an embodiment of the invention provides conditional processing of child functions such that the child function is only invoked if the parent notifies of a change.
FIG. 10B shows pseudo code from an event processor generator according to an embodiment of the invention showing how the generated event processing code handles conditional processing.

FIG. 10A illustrates a conditional processing example. The event handling processing system determines whether the function (1002) has a Boolean return type, which it does. The pseudo code generated by the event handling processing system is shown in FIG. 10B, such that the function f1.onEvent( ) is only invoked if updateChild is true, which is determined by the return value of fa1.onEvent(A).

This concept (known as "dirty support") is used in various prior art situations, but a novel aspect here is the generation of code to support the facility, using static analysis to determine if conditionally support is appropriate only if all a child's parents return a Boolean value.

As the conditional support is configurable, another novel possibility is the ability to turn off this functionality and generate a completely different event processing code. Conditional branching can be expensive and slows processing down due to a phenomenon called pipeline stalling caused by branch prediction failures. It can be advantageous to remove conditional branching in certain high performance situations to achieve significant performance gains. It may be possible to simulate this behaviour by always returning the same Boolean value, but the cost of branching would remain as in the state of the art. The event handling processing system of embodiments of the invention can completely remove the cost of the branch and achieves the highest performance by generating code that has no conditional branches.

Figures 9A, 9B, 9C:
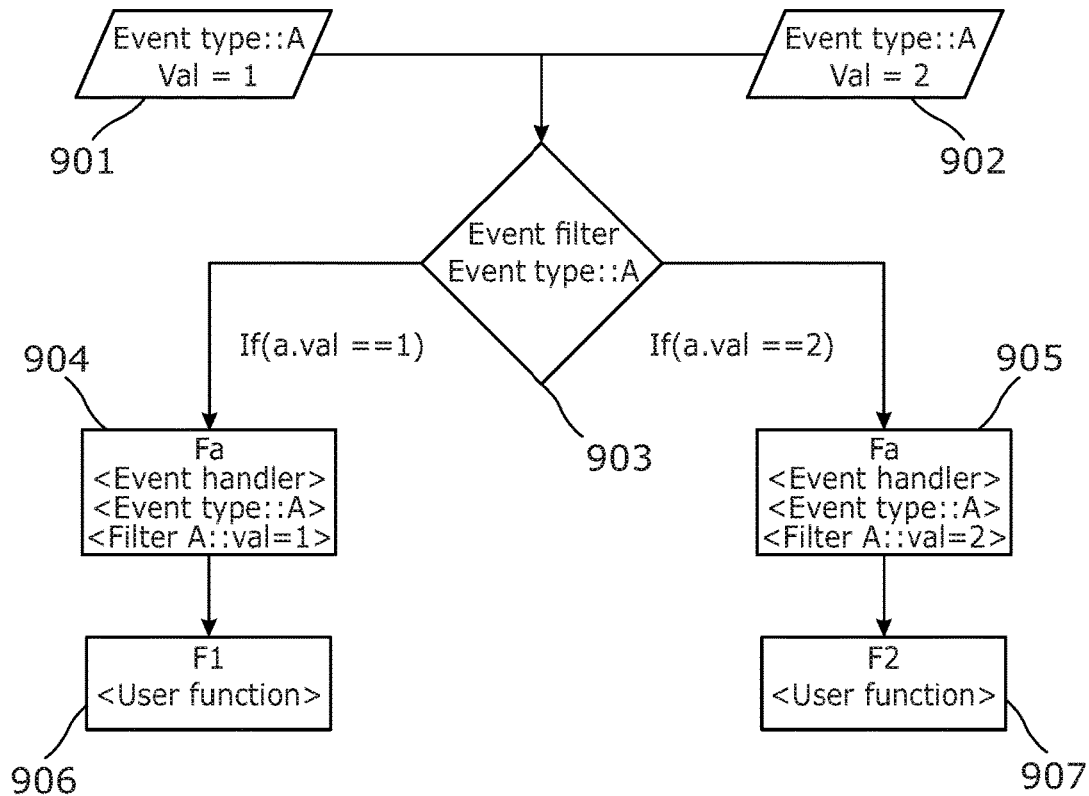
FIG. 9A is a block diagram showing how an event processor generator according to an embodiment of the invention processes events of the same type with different processing chains by filtering on a specific value in the event to determine which chain to navigate.
FIG. 9B shows pseudo code from an event processor generator according to an embodiment of the invention showing how the generated event processing code handles filtering.
FIG. 9C indicates a table showing the processing order of functions for a particular event as defined in the model of FIG. 9A.

Embodiments of the event handling processing system may provide for event filtering where it is required to have finer grain control on which event handler is the root of an event path. FIG. 9A demonstrates the concept of filtering. Both event handler functions (904, 905) handle event type A, but each instance specifies a filter to apply with metadata. This gives two different event paths, keyed by event and filter. The table of FIG. 9C documents the event paths for various event/value combinations. The event handling processing system analyses the metadata and generates code like that shown in FIG. 9B. An example of this use could be reading multiple temperature events from a nuclear reactor: the location may be used as a key so that each event path can be unique for a temperature sensor location, allowing warning limits to be unique to a location.

Figures 11A, 11B:
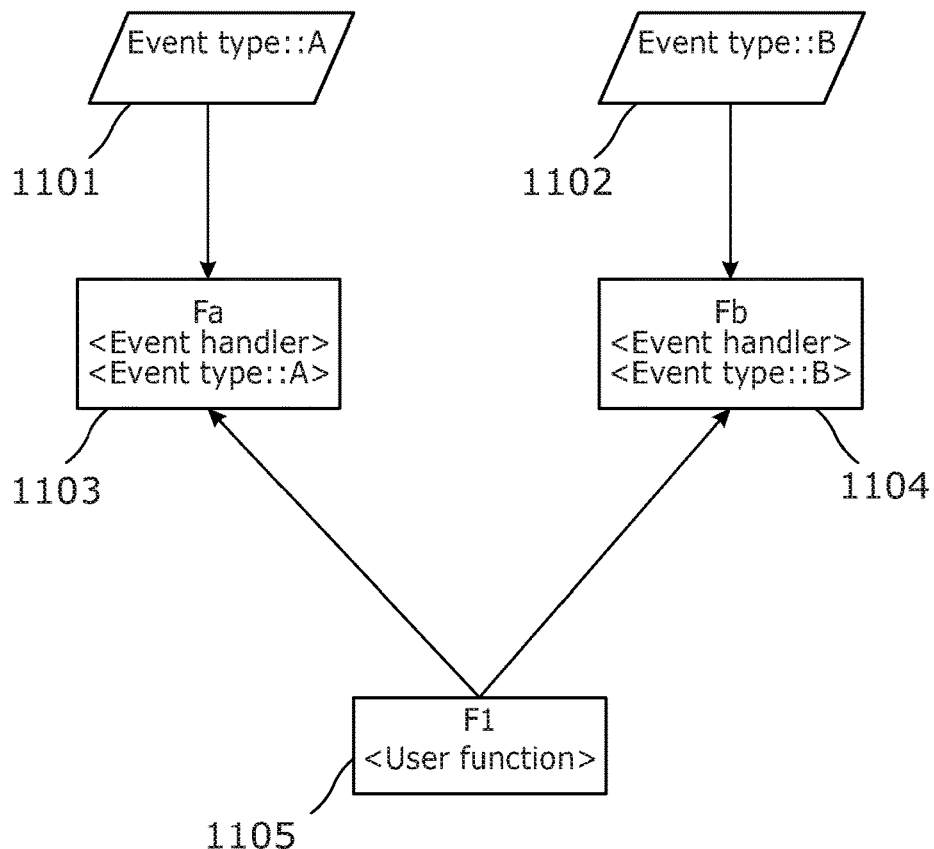
FIG. 11A is a block diagram demonstrating how an event processor generator according to an embodiment of the invention provides a mechanism for a child function to identify which parent has instigated the change notification.
FIG. 11B shows pseudo code from an event processor generator according to an embodiment of the invention showing how the generated event processing code handles event source identification.

Embodiments of the event handling processing system may provide for event source identification. When a function is a member of multiple event paths it is sometimes desirable to know which path has caused the function to be invoked. FIG. 11A demonstrates how the event handling processing system copes with this situation. An instance on the event path F1(1105) may have multiple parents, Fa, Fb (1103, 1104)—if either parent handler processes an event f1.onEvent( ) will be called. F1 can annotate a method that accepts a single parameter, where this parameter is the type of the parent. The event handling processing system will then ensure the source identification method is invoked before the eventHandler method—FIG. 11B illustrates this with pseudocode. There can be multiple event source identification methods in a class, each one accepting a different type of event additionally matching on the instance name of the parent for greater fidelity. An example of the use may be a temperature warning with two parents: the temperature sensor reading; and the time of day. Two different behaviours could be exhibited depending upon the source of the event—for example, as the time changes different warning limits may be applied, whereas when the temperature changes the limit check is always applied.

Figure 12:
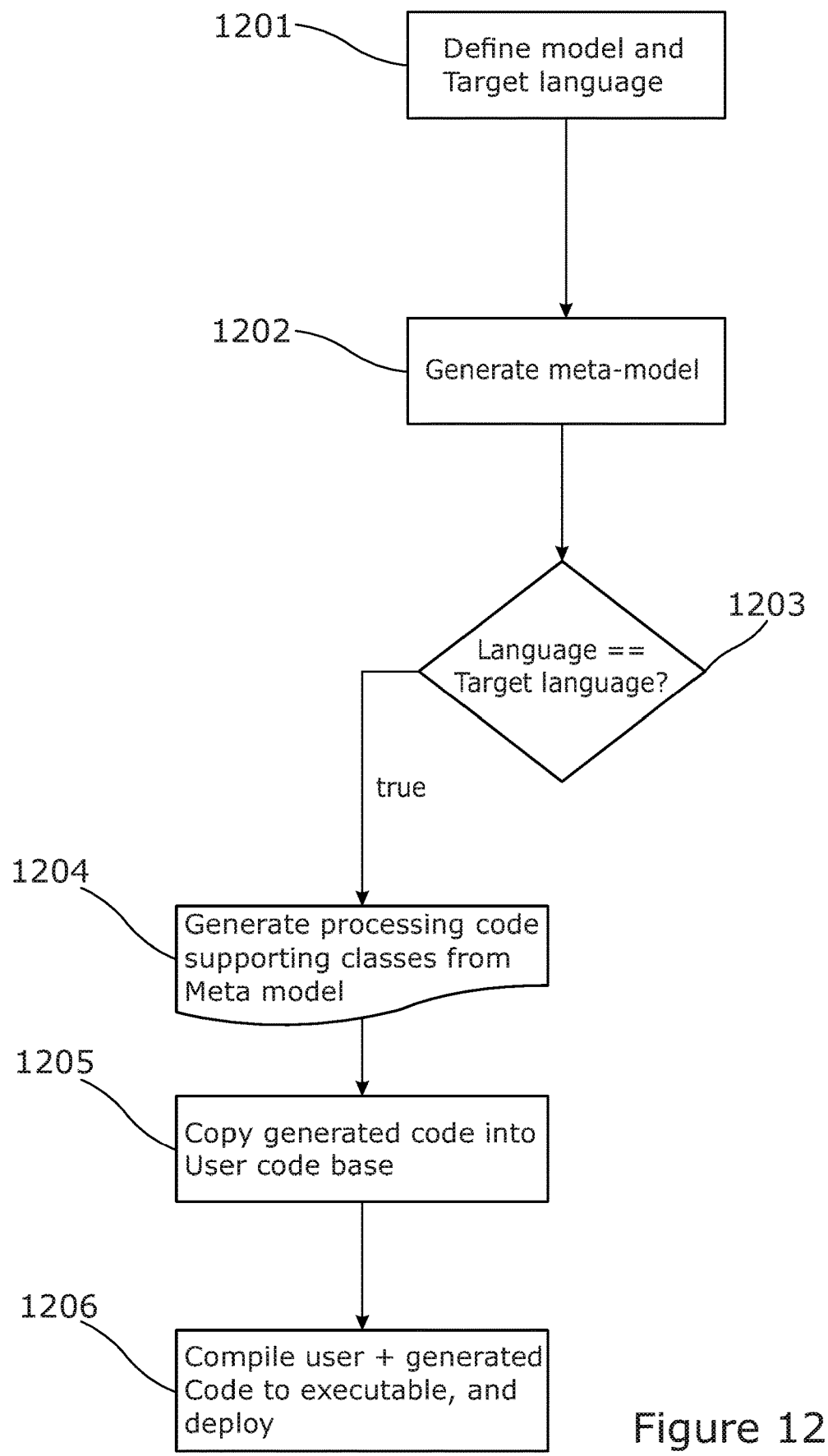
FIG. 12 is a block diagram demonstrating how event processing code generated by an event processor generator in accordance with an embodiment of the invention can be in a selected target language independent of the source model language (for example, a model in Java may generate event processing code in C++)

FIG. 12 shows the concept of language targeting. It is possible for the invention to produce target code in a completely different language than the definition code. For example, the definition may be in Java but the generated code could be C++.

Target code may be provided in more than one language. On certain systems there are specialised pieces of hardware, such as a GPU (graphical processing unit), that may not be accessible from the target event processor language, or the access available is sub-optimal. In this case functions can be generated in a language that exploits the hardware efficiently and the main event processor links against these functions. An example could be a Java event processor with some functions generated in C to use a low level processor intrinsic not available from Java, with the Java event processor calling the C functions when required.

As previously discussed, the event processor generator can generate multi-threaded or distributed processing that can be deployed over multiple machines or cores on a single machine. Configuration specifies if target code should be single threaded, multi-threaded or distributed.

As the event handling processing system is generating code for the main event processing logic, it can also generate helper classes that the event processor generator can use when integrated with the user application. For example, the user may use meta-data to inject an instance as a reference to a node in the event graph. The event handling processing system will search for a factory that can provide the injected instance, if found the factory may decide to create code and will inject a reference to the newly generated type into the existing node. In such a case, the factory will take the roles normally held by the user (ie the definition and configuration of this new class will be provided to the event handling processing system). For example, the user may have asked for a matrix multiplier to be injected into a class. Writing matrix multiplication is error prone and reusable solutions for it can be sub-optimal. The event handling processing system may be able to create a matrix multiplication class that is highly optimised for the application's demands, set this class as a reference at the injection point, and adds the instance to an event set.

Examples of application of embodiments of the invention to specific systems are discussed below.

Example 1—Event Logging

Figure 15:
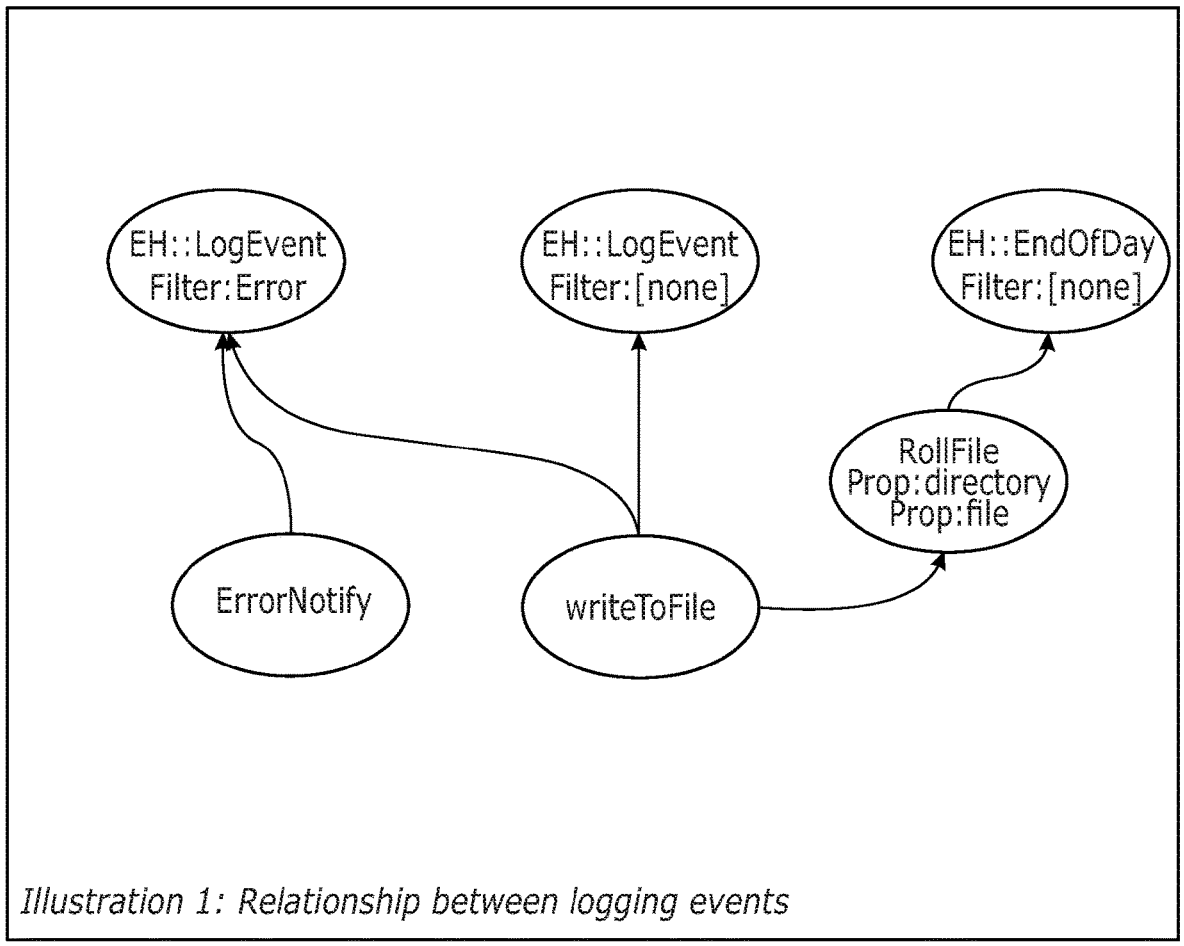
FIG. 15 shows resolution of processing nodes into discrete processing paths in implementation of an embodiment of the invention demonstrating multiple event types and filter processing.

An exemplary application to a simple event logger will now be described with reference to FIG. 15, which shows a relationship between logging events and consequent event handling using an event processor generator system approach.

The input to the event processor generator system here is the user defined notifications, process steps and configuration, which amounts essentially to the following:
input events: Log, EndOfDay
event filter: Log::severity
processing nodes: writeToFile, notifyError, RollFile
configuration: writeToFile::logLocation FIG. 15 illustrates the processing nodes 1501, which are resolved by the event processor generator system into discrete processing paths 1502 each with its own event handler (which is the root node of the DAG representing that processing path). These processing paths can be represented as follows:

| Event | Filter | Processing Nodes |
|---|---|---|
| Log | Severe | EH:LogEvent(Severe), ErrorNotify, WriteToFile |
| Log | * | EH:LogEvent(*), WriteToFile |
| EndOfDay | * | EH:EndOfDay, RollFile |

In this way, each processing node is represented by a graph with an EventHandler at its root, with other steps provided in the processing path—it can be seen here that the filter result leads to a different processing node with a separate EventHandler. Even in an example of this simplicity some degree of complexity results in ensuring that the correct nodes are called for an event in the correct order—this complexity is resolved by the event processor generator system through analysis of class hierarchies and object relationships to produce a logically ordered processing path.

In producing the processing path table in memory, the event processor generator system generates a class file that does the following:
- instantiates all the nodes;
- sets references between nodes;
- sets any properties that are not transient on the nodes; (@init, @teardown and @endOfBatch)
- creates a set of event handler methods that reproduce the same logic as in the processing path table.

Example 2—T-Shirt Printing

Definition and configuration phases will now be illustrated with reference to a slightly more complex example, that of a business process for t-shirt printing. In this scenario the following services are offered by the business:
Processing of customer orders;
Producing any of three colours of shirt (red, white, blue)
Delivery to customer
External inputs requiring a response by the business are (or include):
Receipt of customer order;
Receipt of ink delivery
Receipt of customer return
Internal business process steps are (or include):
Check ink colour stock level;
Order new ink;
Log order;
Log return;
Process new ink;
Check customer credit;
Take payment;
Validate delivery address;
Validate return suitability for resale;
Refund customer;
Post order for delivery.

The event processor generator system may be used to use steps from high level processing flow to produce a set of instructions as output. In step 1, the notifications are defined—classes are created that represent the communications to which the business needs to respond. As can be seen from the above, these comprise responses to three separate external inputs—an event class can be created for each as follows:
NewCustomerOrder
InkDelivery
CustomerReturn Each of the event classes needs to be sufficiently well described to allow subsequent steps to perform correctly. In some cases, event classes may be provided with a filter. Filtering allows the correct event handler to be notified. For example, in the case of ink delivery, the following information may be provided:
class: InkDelivery
data: size, expiry . . .
filter: colour In this way a separate eventhandler can be invoked for each colour of ink.

As discussed, the process steps set out above are also represented as classes, with sufficient additional information provided for each to allow analysis to be carried out. This additional information relates particularly to the relationship between process steps and any triggering or filtering conditions. The way in which these are represented in embodiments are as follows:

Parents: The parents of a step are the processing steps that must be notified and processed before that step. These will usually be expressed as references to another class as a member variable.

EventHandler: This is the first step on an instruction set—typically a class of event that responds directly to an external input (such as a business event)—this event will be one of those defined in step 1 above. The EventHandler can be represented by the class implementing an EventHandler interface, or the identity of the EventHandler may simply be written into the method.

FilterId: There may be multiple instances of a class to respond to the same type of event, typically when different processing is required for each, with the filter being the condition that determines which instance is to be used in any particular case. For example, there may be three instances of the class responsive to InkDelivery events, each being for one of the three different colours of ink (with the colour being the filter). Processing steps may be different for one or more of these instances—for example, should blue ink be toxic it may require different processing to ensure user safety.

Lifecycle methods: Different behaviour may be required at different points in a process lifecycle (such as at the start of processing, the end of processing, or responsive to a change in a parent). Annotation will indicate where these differences apply and these will be reflected in the resulting representation of the process.

An exemplary representation of the processing steps identified below as classes may look as follows:

| Name | Events Handled | Event Filter | Parents | Lifecycle Methods |
|---|---|---|---|---|
| LogOrder | NewCustomerOrder | | | |
| LogReturn | CustomerReturn | | | |
| ProcessInk | InkDelivery | Colour | | |
| CheckInk | | | | |
| CostCalculator | | | | |
| OrderInk | | | | |
| Stock Validator | | | | |
| CheckCredit | | | | |
| TakePayment | | | | |
| CheckAddress | | | | |
| CheckReturn | | | | |
| RefundPayment | | | | |
| PostOrder | | | | |

Configuration data is provided to allow each process to be fully defined, and to establish which process steps are used and which events are to be handled. For example, in this T-shirt printing example, the configuration data may establish that there are three colours of ink available and establish the criteria under which reorder is needed so that ink levels do not drop too low.

Example 3—Word Counter

As has been described above, an event is associated with an event handler type, and there may be a filter associated with the event handler. This provides for representation of multiple event types, but in some cases a large number of classes may result that are more effectively addressed by labelling multiple methods in a single class. FIG. 16A shows an exemplary word counter implementation—a single class is adapted to handle char events with multiple filter types (eol, breaking chars, any char, word chars) and an end of file event. FIG. 16B shows an exemplary generated class, adapted to execute rapidly on a Java Virtual Machine.

A mechanism is provided to notify a child node when all parents have been processed—the @OnEvent annotation. In some cases it may be necessary for notification to be provided that a specific parent has updated—@OnParentUpdate can be used for this with a parent identified by parameter. Filtering can also be applied to @OnParentUpdate—this may be useful if, for example, a child has two parents of the same type but needs unique parent notification.

Example 4—Asset Handling

Figure 17:
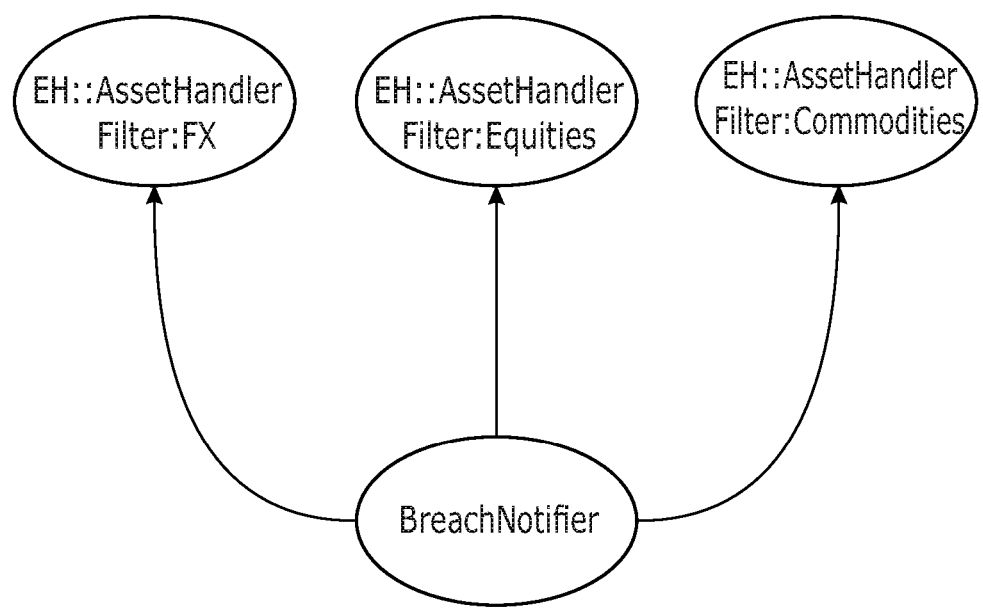
FIG. 17 illustrates an example of instance filtering and conditional processing strategies in event propagation according to embodiments of the invention.

"Dirty" filtering can be applied to event propagation, ensuring that children are only notified if a parent is changed. FIG. 17 illustrates an example of this approach in which change of asset value is monitored, with notification only when an asset value has changed by 10%. FIG. 17 shows three AssetHandler event handlers each filtered by a different asset type (here FX, equities and commodities) and each linked to a BreachNotifier node. When there is a delta of greater than 10% in value for that commodity type, the method returns a Boolean result to condition the notification of children—code to illustrate this is shown in FIG. 18A, with the resulting event processor generator system output in FIG. 18B.

The event processor generator system can generate code to check whether a specific parent has updated and to notify the child when there is a return value of true. The process can call the onEvent method if any parent has updated. Following an event, all flags can be reset by the afterEvent method.

Example 5—Flight Delays

FIGS. 19A to 19H show an exemplary calculation of average flight delay per airline using declarative provision of input functions. The example also illustrates conditional processing, grouping, aggregate calculations, public node access and function generation. All the functions in the DAG are created by the event processor generator. The user only defines the incoming flight details event, the carrier delay results holder and the query (FlightDelaySepDeclarativeBuilder). The query is written in Java (no intermediate language is required) and the results are available as a public node named "carrierDelayMap".

FIG. 19A shows the public class resulting in the public node, with FIGS. 19B and 19C showing the two data holder classes created by the user. The event processor generated is shown in FIG. 19D. FIGS. 19E, 19F, 19G and 19H are all helper classes generated by the event processor generator.

The invention claimed is:

1. A method of providing instructions to a computing apparatus for improved event handling, the method comprising:
    providing instructions for execution on the computing apparatus to an event processor generator, the instructions comprising a plurality of functional steps, a set of dependencies between the functional steps, and configuration data;
    the event processor generator creating instances of the functional steps from the instructions and representing the instances as directed acyclic graphs;
    the event processor generator identifying a plurality of event types and topologically sorting the directed acyclic graphs to determine a topologically ordered event path for each event type; and
    the event processor generator providing a revised set of instructions for execution on the computing apparatus in which original instructions have been replaced by instructions requiring each event type to be executed according to its topologically ordered event path, wherein the revised set of instructions comprises event processor code for processing one or more events suitable for compilation with other code for execution on the computing apparatus.

2. The method of claim 1, wherein the revised set of instructions are adapted to invoke a subset of functions in a repeatable order when a specific event is identified by the computing apparatus.

3. The method of claim 2, wherein the repeatable order is such that no dependent function is invoked before its parent.

4. The method of claim 1, wherein the revised set of instructions generates a state machine, where an internal state of a node changes based on an incoming event.

5. The method of claim 1, wherein the revised set of instructions is adapted to handle multiple event types, wherein a specific processing chain is determined for each event type, wherein a processing chain is a plurality of functions invoked in a repeatable order.

6. The method of claim 5, wherein one or more helper functions are used to create part or whole processing chains.

7. The method of claim 1, wherein the revised set of instructions provides conditional branching, such that subsequent functions are only evaluated when a preceding function for that subsequent function indicates that a change has occurred.

8. The method of claim 1, wherein the revised set of instructions provides event identification, wherein a function receives notification which of its parent functions has updated.

9. The method of claim 1, wherein the revised set of instructions provide value filtering, such that at least one branching event is based on both event type and values in the event.

10. The method of claim 1, wherein one or more of the functions are provided declaratively.

11. The method of claim 1, wherein one or more functions are provided in conjunction with a set of factories.

12. The method of claim 1, wherein providing instructions for execution on the computer processing apparatus to an event processor generator comprises only providing a plurality of functional steps, a set of dependencies between the functional steps, and configuration data, all without any graph description, and wherein the event processor generator infers a graph description for creating instances of the functional steps from the instructions.

13. The method of claim 1, wherein in creating instances of the functional steps from the instructions, the event processor generator infers execution paths from the plurality of functional steps and associated metadata.

14. The method of claim 1, wherein the event processor code is adapted for inclusion with a client application to act as an event processor for that client application.

15. The method of claim 1, wherein the event processor code is in a target language different from a language used in the event processor generator.

16. The method of claim 1, wherein the event processor code has one part in a first target language and another part in a second target language.

17. A computing apparatus comprising a processor and a memory, wherein the memory comprises code which when performed by the processor carries out the function of an event processor generator for carrying out the method of providing instructions to computer processing apparatus according to claim 1.

18. A computing apparatus comprising a non-transitory storage medium with event processor code prepared by the method of claim 1 stored thereon and a processor adapted to execute the event processor code in the non-transitory storage medium.

* * * * *